(12) United States Patent
Wilson

(10) Patent No.: US 11,472,534 B2
(45) Date of Patent: Oct. 18, 2022

(54) ROTOR HUBS HAVING PITCH CONTROL SYSTEMS AND RELATED METHODS

(71) Applicant: The Boeing Company, Chicago, IL (US)

(72) Inventor: Nicholas Louis Wilson, Drexel Hill, PA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/457,116

(22) Filed: Jun. 28, 2019

(65) Prior Publication Data

US 2020/0407044 A1    Dec. 31, 2020

(51) Int. Cl.
| | |
|---|---|
| *B64C 11/06* | (2006.01) |
| *B64C 11/32* | (2006.01) |
| *B64C 27/605* | (2006.01) |
| *B64C 11/38* | (2006.01) |

(52) U.S. Cl.
CPC .............. *B64C 11/06* (2013.01); *B64C 11/32* (2013.01); *B64C 27/605* (2013.01); *B64C 11/38* (2013.01)

(58) Field of Classification Search
CPC ........ B64C 11/06; B64C 11/38; B64C 27/605
See application file for complete search history.

(56) References Cited

U.S. PATENT DOCUMENTS

| 1,623,549 | A | * | 4/1927 | Nosan | ..................... B64C 11/36 416/167 |
| 3,012,614 | A | * | 12/1961 | Smyth-Davila | ....... B64C 27/605 416/115 |
| 3,217,809 | A | | 11/1965 | Bossier, Jr. | |
| 3,232,349 | A | | 2/1966 | Ballauer | |
| 4,375,940 | A | | 3/1983 | Lovera et al. | |
| 4,957,413 | A | * | 9/1990 | Reich | ........................ B63H 1/10 416/108 |
| 5,431,539 | A | * | 7/1995 | Carvalho | ................. B64C 11/32 416/157 R |
| 7,585,153 | B1 | | 9/2009 | Schmaling et al. | |
| 8,360,721 | B2 | * | 1/2013 | Podgurski | ............... B64C 27/35 416/1 |
| 8,858,179 | B2 | | 10/2014 | Cowles | |

FOREIGN PATENT DOCUMENTS

WO    2016028762    2/2016

* cited by examiner

*Primary Examiner* — Woody A Lee, Jr.
*Assistant Examiner* — Jesse M Prager
(74) *Attorney, Agent, or Firm* — Hanley, Flight & Zimmerman, LLC

(57) ABSTRACT

Rotor hubs having pitch control systems and related methods are disclosed herein. An example apparatus includes a housing including a first housing arm to support a first blade grip and a first blade spindle and a second housing arm to support a second blade grip and a second blade spindle. The example apparatus includes a first pitch link and a second pitch link. The example apparatus includes a first pitch arm coupled to the first pitch link and one of the first blade grip or the first blade spindle and a second pitch arm coupled to the second pitch link and one of the second blade grip or the second blade spindle. The second pitch arm is to extend past the first housing arm to couple with the one of the second blade grip or the second blade spindle.

20 Claims, 14 Drawing Sheets

ROTOR HUBS HAVING PITCH CONTROL SYSTEMS AND RELATED METHODS

FIELD OF THE DISCLOSURE

This disclosure relates generally to rotor hubs and, more particularly, to rotor hubs having pitch control systems and related methods.

BACKGROUND

A rotorcraft vehicle (e.g., a helicopter) includes blades supported by a rotor hub. The rotor hub can include a control system for adjusting a pitch angle of the blades.

SUMMARY

An example apparatus includes a housing including a first housing arm to support a first blade grip and a first blade spindle and a second housing arm to support a second blade grip and a second blade spindle. The example apparatus includes a first pitch link and a second pitch link. The example apparatus includes a first pitch arm coupled to the first pitch link and one of the first blade grip or the first blade spindle. The example apparatus includes a second pitch arm coupled to the second pitch link and one of the second blade grip or the second blade spindle. The second pitch arm is to extend past the first housing arm to couple with the one of the second blade grip or the second blade spindle.

An example apparatus includes a housing including a first housing arm to support a first blade and a second housing arm to support a second blade; a first pitch arm coupled to a first pitch link and extending to the first housing arm, the first pitch arm to cause a change of a pitch angle of the first blade; and a second pitch arm coupled to a second pitch link and extending to the second housing arm. The second pitch arm is to cause a change of a pitch angle of the second blade. The first pitch link is spaced apart from the first housing arm by the second housing arm.

Another example rotor hub includes a first pitch link and a second pitch link. At least a portion of an end of the first pitch link and an end the second pitch link are disposed in a plane. The example rotor hub includes a first pitch arm having a first end coupled to the end of the first pitch link. A first portion of the first pitch arm is to extend from the end of the first pitch link in a first direction relative to the plane. The example rotor hub includes a second pitch arm having a first end coupled to the end of the second pitch link. A first portion of the second pitch arm is to extend from the end of the second pitch link in a second direction relative to the plane. The first direction is opposite the second direction.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A rotorcraft vehicle (e.g., a helicopter) includes blades supported by a rotor hub. In some examples, a pitch angle of each blade can be adjusted during flight of the rotorcraft vehicle via a blade pitch control system that is at least partially carried by the rotor hub. A pitch angle of the blades may be adjusted to affect, for instance, lift of the vehicle.

Figure 1:
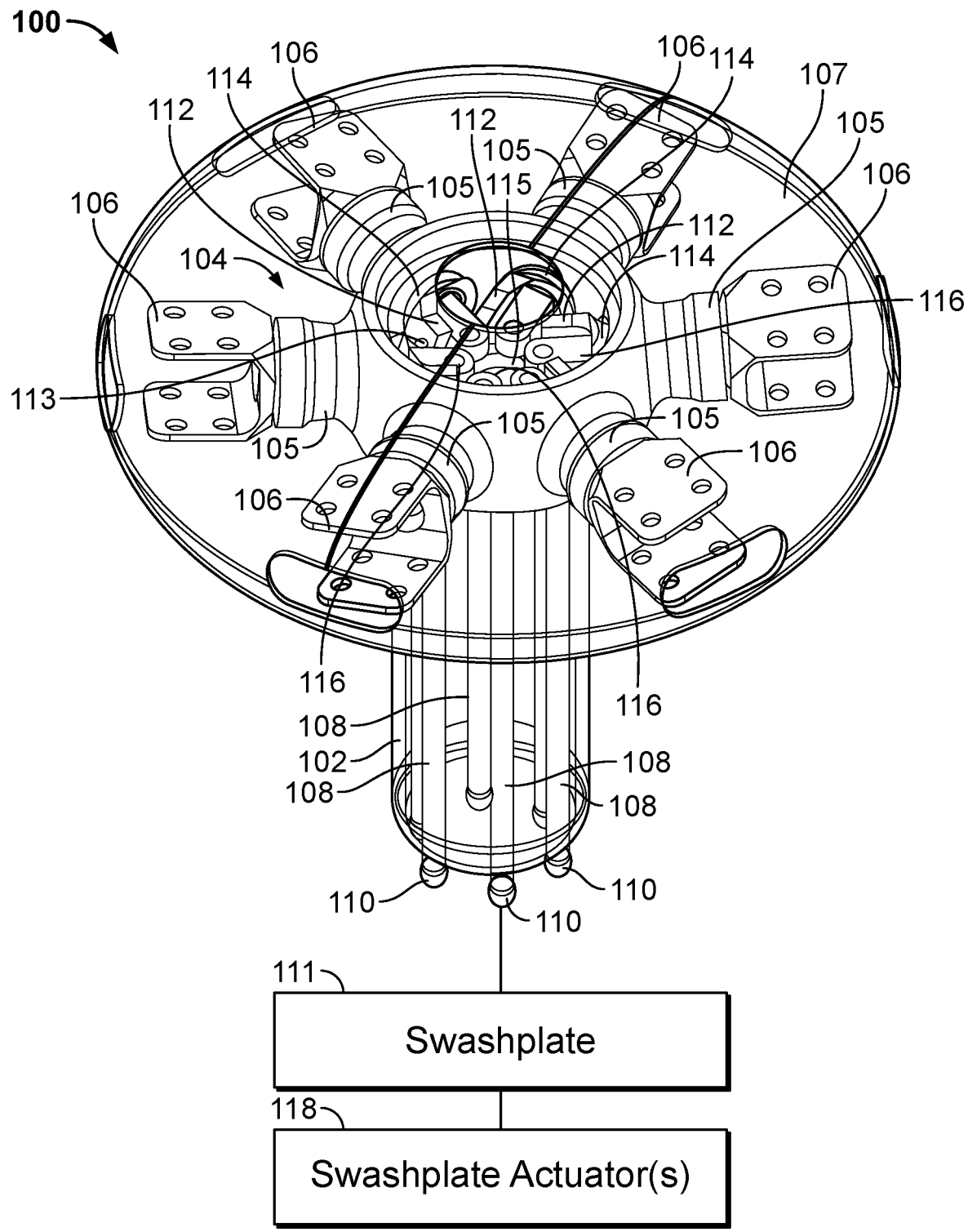
FIG. 1 illustrates a rotor hub known in the art.

FIG. 1 shows a rotor hub 100 known in the art. The known rotor hub 100 of FIG. 1 includes a shaft 102 and a housing 104 coupled to the shaft 102. A plurality of blade grips 106 are coupled to the housing 104 via respective arms 105 of the housing 104. A blade (FIG. 2) is to be coupled to each of the blade grips 106. The known rotor hub 100 includes a hub fairing 107.

The known rotor hub 100 of FIG. 1 includes a plurality of pitch links 108 disposed in the shaft 102. In FIG. 1, the rotor hub 100 includes six pitch links 108, each having a first end 110 coupled to a swashplate 111 (e.g., including a rotating disk and a non-rotating disk). A pitch horn or arm 112 is pivotably coupled to a second end 113 of each pitch link 108 and to a respective blade grip 106 via a blade spindle 114. The blade spindle 114 connects to the housing 104 via pitch bearings (not shown), which allow relative rotation between the blade spindle 114 and the housing 104. The rotor hub 100 of FIG. 1 includes a plurality of tension-torsion straps 116 that couple to the respective blade grips 106 and absorb centrifugal forces during spinning of the blades via carrier plates 115 (e.g., top and bottom carrier plates, where the bottom carrier plate 115 shown in FIG. 1 for illustrative purposes).

In use, movement of the swashplate 111, which can include vertical translation, rotation (of the rotating disk)

and tilting, is driven by actuator(s) 118 (e.g., hydraulic actuator(s)) operatively coupled to the swashplate 111. The pitch links 108 transfer movement of the swashplate 111 to the blades via the pitch arms 112 to adjust the pitch of the blades. In particular, each pitch arm 112 provides a moment arm that causes rotation of the blades relative to the housing 104 via the respective blade spindle 114 in response to forces provided by the corresponding pitch links 108.

Figure 2:
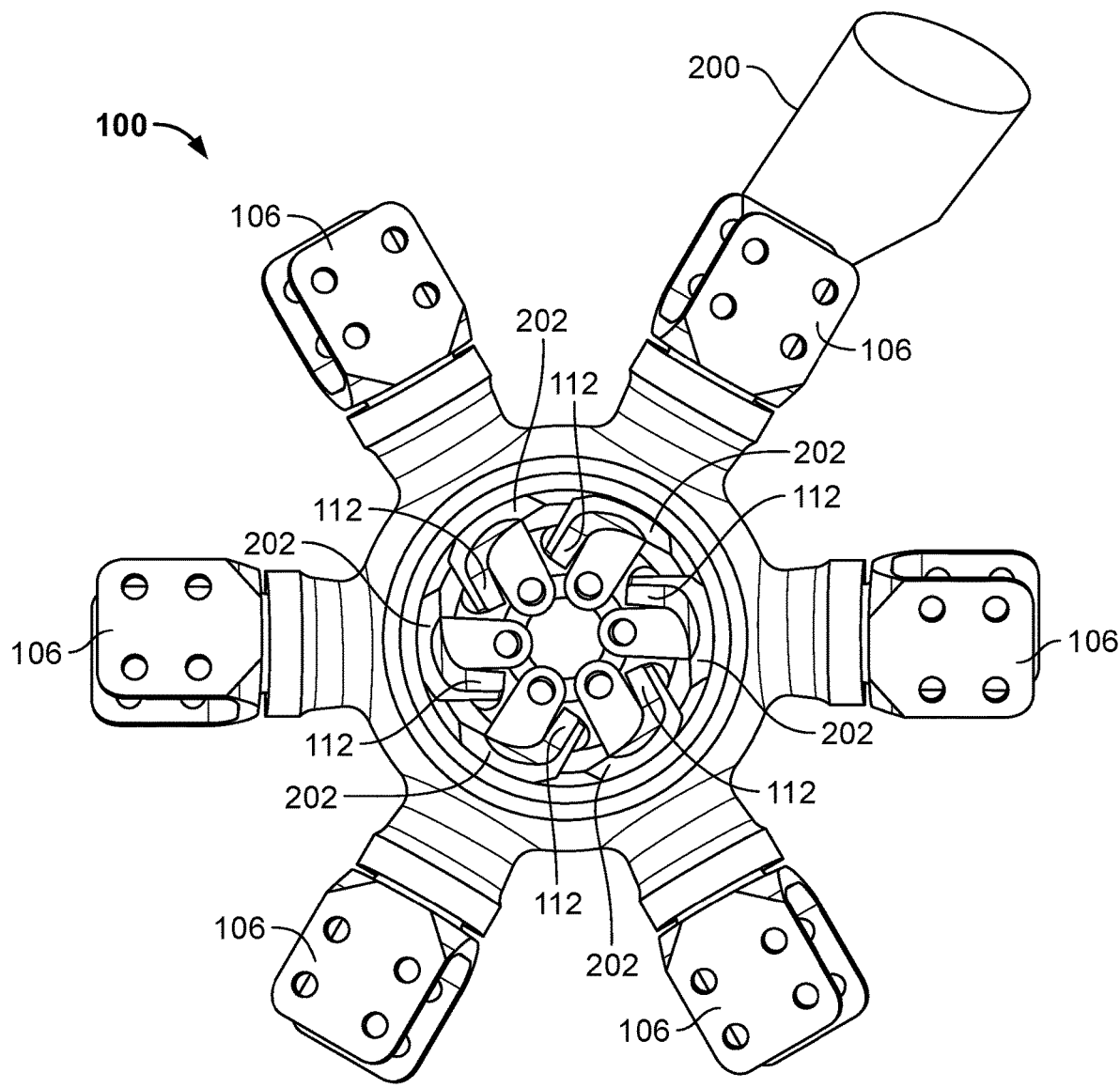
FIG. 2 is a top view of the known rotor hub of FIG. 1.

FIG. 2 is a top view of the known rotor hub 100 of FIG. 1. For illustrative purposes, the hub fairing 107 is not shown. Also, for illustrative purposes, an example blade 200 is shown in FIG. 2 coupled to one of the blade grips 106 with the understanding that each of the blade grips 106 includes a blade 200 coupled thereto. As shown in FIG. 2, each blade spindle 202 couples to a pitch arm 112 that is immediately adjacent to the pitch link 108 to which the pitch arm 112 is also coupled. Thus, in the known rotor hub 100 of FIGS. 1 and 2, the respective pitch arms 112 control the pitch angle of an immediately leading blade or an immediately following blade (based on the rotational direction of the rotor hub 100) to which the pitch arm 112 is adjacent.

Increasing the moment arm length with which to provide control over the blade pitch via the pitch arms can result in reduced loads on the pitch control system and increased stability of the pitch control system. However, increasing the length of the pitch arms typically results in increasing a volume of the rotor hub to accommodate the longer pitch arms. For example, a diameter of the rotor hub may be increased to house the longer pitch arms. However, increasing a volume of the rotor hub can result in increased weight to be carried by the vehicle, which can affect flight of the vehicle, fuel efficiency, payload capacity, etc.

Disclosed herein are example rotor hubs including pitch arms that provide for increased length of the moment arms provided by the pitch arms as compared to known pitch arms and without increasing the volume of the rotor hub. In examples disclosed herein, the pitch arms are arranged in an interlaced or interwoven pattern such that the pitch arms pass over or under one another in an alternating manner to extend past an immediately leading or following blade that is adjacent to a respective pitch link to which the pitch arms are coupled. Thus, the example pitch arms disclosed herein control the pitch angle of a blade different than the immediately adjacent blade. As result of the extension of a pitch arm past an immediately adjacent blade and the operative coupling of the pitch arm with a blade that is not immediately adjacent, a moment arm that provides for pitch control via the pitch arm is increased. The increased moment arm provides for increased blade pitch control authority and, thus, improved stability of the rotor. The interlaced pattern of the pitch arms provides for a compact design configuration that does not increase a size of the rotor hub.

The example interlaced pattern of the pitch arms can be implemented with various types of rotor hubs including, for example, rotor hubs in which the pitch links are disposed external to the rotor shaft and/or rotor hubs in which the blades are disposed in different horizontal planes. Thus, the increased moment arms and, as a result, increased blade pitch control and decreased control loads can be achieved with different rotor hub designs without increasing or substantially increasing a size of the rotor hub.

Although examples disclosed herein are discussed in the context of rotorcraft vehicles, teachings disclosed herein can be utilized in other applications such as wind turbines or turbine engines. As such, the discussion of rotorcraft vehicles is for illustrative purposes only and does not limit this disclosure to rotorcraft vehicle applications.

Figure 3:
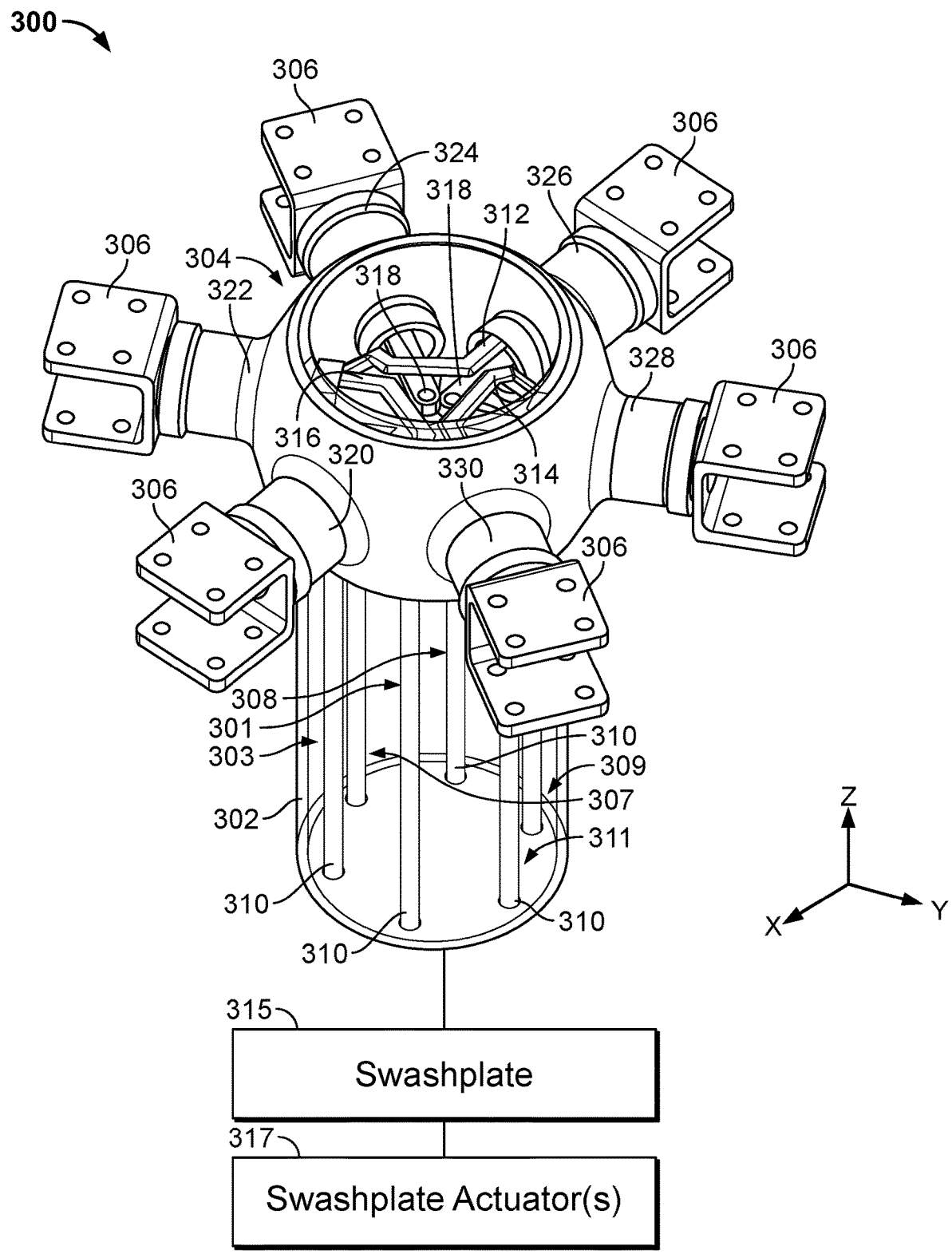
FIG. 3 illustrates an example rotor hub in accordance with teachings of this disclosure.

FIG. 3 illustrates an example rotor hub 300 in accordance with teachings of this disclosure. The example rotor hub 300 includes a shaft 302 and a housing 304 coupled to the shaft 302. The example rotor hub 300 of FIG. 3 includes blade grips 306 disposed in respective arms of the housing 304, where the blade grips 306 couple blades (FIG. 4) to the example rotor hub 300. In the example of FIG. 3, the housing 304 includes a first housing arm 320, a second housing arm 322, a third housing arm 324, a fourth housing arm 326, a fifth housing arm 328, and a sixth housing arm 330 to accommodate six blades. However, the example rotor hub 300 of FIG. 3 can include additional or fewer housing arms and corresponding blade grips and, thus, can accommodate additional or fewer blades. Also, the example rotor hub 300 can include other components such as a hub fairing.

The example rotor hub 300 of FIG. 3 includes a plurality of pitch links extending through the shaft 302. In FIG. 3, the rotor hub 100 includes a first pitch link 301, a second pitch link 303, a third pitch link 307, a fourth pitch link 308, a fifth pitch link 309, and a sixth pitch link 311. The example rotor hub 300 can include additional or fewer pitch links based on, for instance, the number of blades supported by the rotor hub 300. The pitch links 301, 303, 307, 308, 309, 311 include respective first ends 310 that couple to a swashplate 315. Movement of the swashplate 315 via swashplate actuator(s) 317 causes the pitch links 301, 303, 307, 308, 309, 311 to move along a z-axis (e.g., up and down). In the example of FIG. 3, the z-axis extends parallel to a longitudinal axis of the shaft 302. Although in the examples disclosed herein, the swashplate 315 is disposed below the rotor hub 300, the example swashplate 315 can be located above the rotor hub 300 or external to the shaft 302. In such examples, the position of the pitch links and other components of the pitch control system may be adjusted based on the location of the swashplate 315.

The example rotor hub 300 of FIG. 3 includes pitch arms pivotably coupled to respective ones of the pitch links 301, 303, 307, 308, 309, 311. The pitch links 301, 303, 307, 308, 309, 311 manipulate the corresponding pitch arms based on movement of the swashplate 315 to control the pitch of the blades coupled to the blade grips 306. As shown in the example of FIG. 3, the rotor hub 300 includes a first pitch arm 312, a second pitch arm 314, and a third pitch arm 316. As disclosed herein, the example rotor hub 300 includes additional pitch arms (FIG. 4) such that each pitch link 301, 303, 307, 308, 309, 311 is coupled to a respective pitch arm. The example rotor hub 300 of FIG. 3 includes a plurality of tension-torsion straps 318 to couple the blade grips 306 and to react centrifugal forces during spinning of the blades of the rotor hub 300. In FIG. 3, the pitch arms of the example rotor hub 300 at least partially extend over, under, and/or around one or more of the tension-torsion straps 318 when the example rotor hub 300 is oriented as shown in FIG. 3 to adjust the blade angle.

Figure 4:
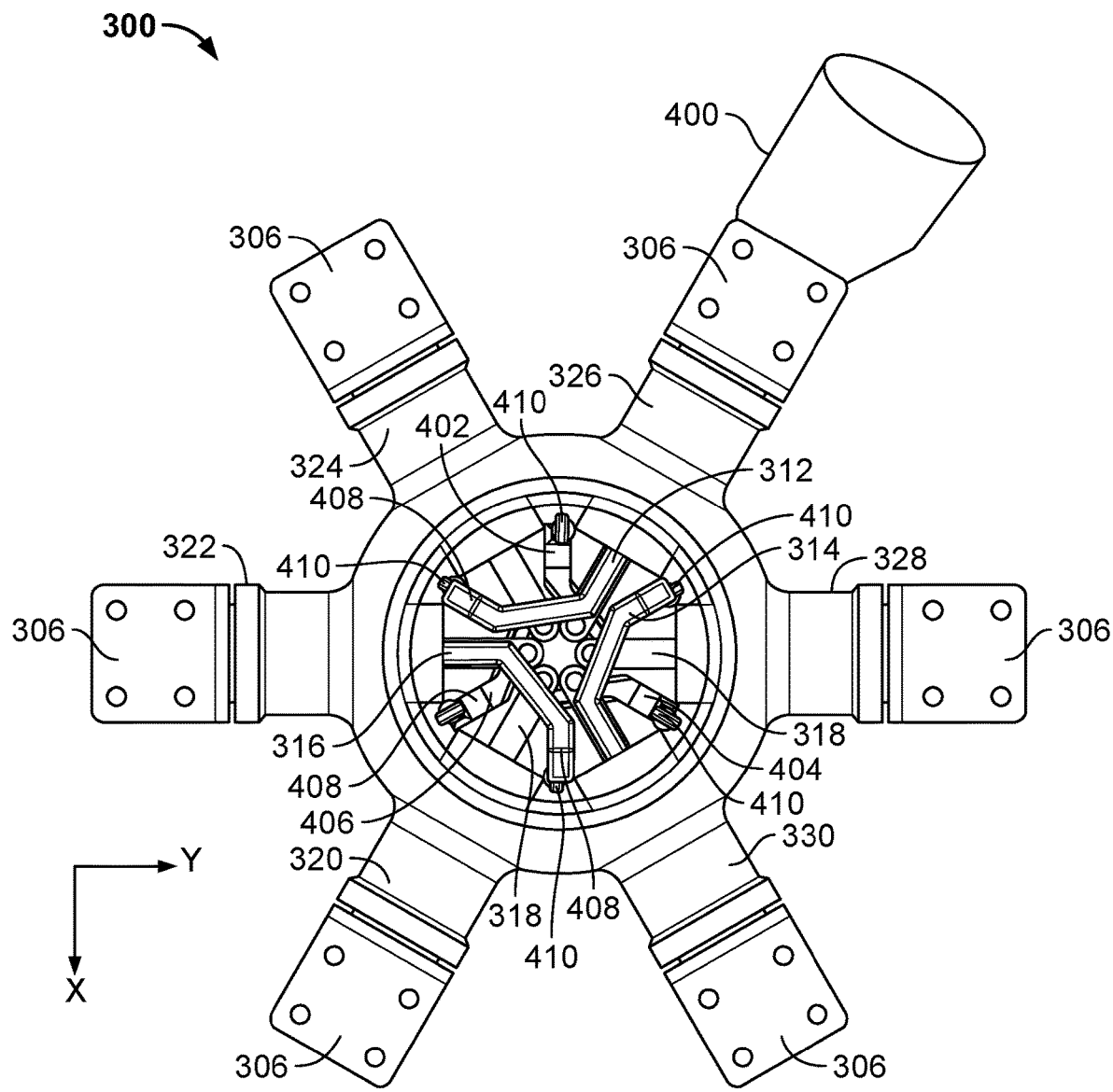
FIG. 4 is a top view of the example rotor hub of FIG. 3.

FIG. 4 is a top view of the example rotor hub 300 of FIG. 3. For illustrative purposes, an example blade 400 is shown in FIG. 4 coupled to one of the blade grips 306 with the understanding that each of the blade grips 306 of the rotor hub 300 includes a blade 400 coupled thereto.

In addition to the first, second, and third pitch arms 312, 314, 316 shown in FIG. 3, the example rotor hub 300 includes a fourth pitch arm 402, a fifth pitch arm 404, and a sixth pitch arm 406. The example rotor hub 300 can include additional or fewer pitch arms than shown in the examples of FIGS. 3 and 4. Respective first ends 408 of the pitch arms 312, 314, 316, 402, 404, 406 are pivotably coupled to ends 410 of the corresponding pitch links 301, 303, 307, 308, 309, 311 (where the ends 410 of the pitch links 301, 303, 307, 308, 309, 311 are opposite the ends 310 of the pitch links 301, 303, 307, 308, 309, 311 that couple to the swashplate 315). In the example of FIG. 4, the ends 410 of the pitch links 301, 303, 307, 308, 309, 311 are disposed in an x-y plane (i.e., a horizontal plane). Thus, each of the pitch arms 312, 314, 316, 402, 404, 406 is coupled to a corresponding pitch link in the same plane.

As shown in FIG. 4, the pitch arms 312, 314, 316, 402, 404, 406 are arranged in an interwoven or interlaced pattern such that certain ones of the pitch arms 312, 314, 316, 402, 404, 406 extend over the tension-torsion straps 318 and certain ones of the pitch arms 312, 314, 316, 402, 404, 406 extend under the tension-torsion straps 318. In particular, in the example of FIG. 4, the first, second, and third pitch arms 312, 314, 316 extend over the tension-torsion straps 318 and, thus, at least partially extend upward relative to the x-y plane in which the ends 410 of the pitch links 301, 307, 309 (FIG. 3) to which the first, second, and third pitch arms 312, 314, 316 coupled are disposed. Also, in the example of FIG. 4, the fourth, fifth, and sixth pitch arms 402, 404, 406 extend under the tension-torsion straps 318 and, thus, at least partially extend downward relative to the x-y plane in which the ends 410 of the pitch links 303, 308, 311 (FIG. 3) to which the pitch arms 402, 404, 406 are disposed. As also shown in FIG. 4, each of the pitch arms 312, 314, 316, 402, 404, 406 extends from the ends 410 of the pitch links 301, 303, 307, 308, 309 at an angle and toward a center of the rotor hub 300 so as not to interfere with, for instance, the components disposed in the housing arms 320, 322, 324, 326, 328, 330 (e.g., the blade spindles) immediately adjacent to the pitch links 301, 303, 307, 308, 309, 311.

Figure 5:
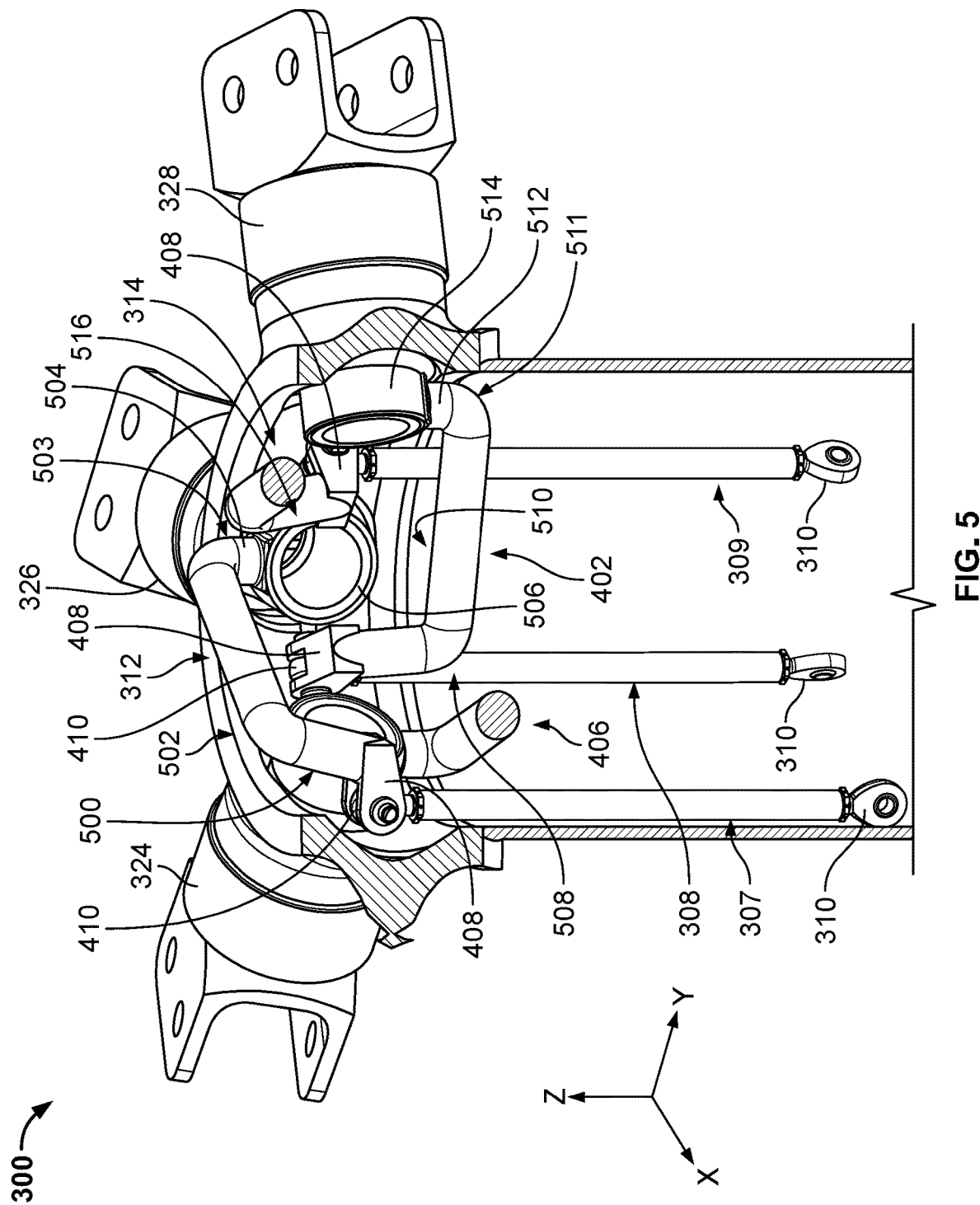
FIG. 5 is a side cutaway view of the example rotor hub of FIG. 3.

FIG. 5 is a side, cut-away view of the example rotor hub 300 of FIGS. 3 and 4. In particular, FIG. 5 shows the first pitch arm 312, the fourth pitch arm 402, a portion of the second pitch arm 314, and a portion of the sixth pitch arm 406. As shown in FIG. 5, the end 408 of the first pitch arm 312 is coupled to the end 410 of the third pitch link 307. Also, the end 408 of the fourth pitch arm 402 is coupled to the end 410 of the fourth pitch link 308. The end 408 of the second pitch arm 314 is coupled to the end 410 of the fifth pitch link 309. For illustrative purposes, the tension-torsion straps 318 are not shown in FIG. 5.

As shown in FIG. 5, a first portion 500 of the first pitch arm 312 extends from the second end 410 of the third pitch link 307 to which the first pitch arm 312 is coupled in a first direction along the z-axis, where the first direction points away from the first end 310 of the third pitch link 307 that couples to the swashplate 315 (FIG. 3). A second portion 502 of the first pitch arm 312 extends substantially along an x-y plane past the third housing arm 324 and toward the fourth housing arm 326. A third portion 503 of the first pitch arm 312 extends in a second direction along the z-axis opposite the first direction to enable a second end 504 of the first pitch arm 312 to couple with a blade spindle 506 disposed in the fourth housing arm 326.

As also shown in FIG. 5, a first portion 508 of the fourth pitch arm 402 extends from the second end 410 of the fourth pitch link 308 in the second direction along the z-axis toward the first end 310 of the fourth pitch link 308 that couples to the swashplate 315 opposite the first direction in which the first portion 500 of the first pitch arm 312 extends. A second portion 510 of the fourth pitch arm 402 extends substantially along an x-y plane past the fourth housing arm 326 toward the fifth housing arm 328. A third portion 511 of the fourth pitch arm 402 extends in the first direction along the z-axis to enable a second end 512 of the fourth pitch arm 402 to couple with a blade spindle 514 disposed in the fifth housing arm 328. Thus, the example pitch arms 312, 402 can be at least partially U-shaped or C-shaped or include substantially U-shaped or C-shaped portions.

As shown in FIG. 5, a first portion 516 of the second pitch arm 314 extends in the first direction substantially along the z-axis, or away from the first end 310 of the fifth pitch link 309, similar to the first pitch arm 312. Further, the sixth pitch arm 406 extends from the pitch link to which the sixth pitch arm 406 is coupled (e.g., the first pitch link 301 of FIG. 1) in a manner similar to the fourth pitch arm 402 in that at least a portion of the sixth pitch arm 406 (not shown) extends toward the end 310 of the pitch link that couples with the swashplate 315. Thus, in the example of FIG. 5, the pitch arms 312, 314, 402, 406 are arranged in an alternating pattern such that adjacent ones of the pitch arms 312, 314, 402, 406 include portions extending in opposite directions substantially along the z-axis in the orientation of FIG. 5.

Further, as shown in FIG. 5 with respect to the first and fourth pitch arms 312, 402, the pitch arms 312, 402 extend across the rotor hub 300 to couple to the respective blade spindles 506, 514 disposed in the respective ones of the housing arms 326, 328, rather than coupling with the blade spindle associated with the housing arm that is immediately adjacent to the end of the pitch link 307, 308 to which the pitch arm 312, 402 is coupled. For instance, the third pitch link 307 is spaced apart from the fourth housing arm 326 by, for example, the third housing arm 324 and the fourth pitch link 308. The first pitch arm 312 extends past the third housing arm 324 that is immediately adjacent to the location in the rotor hub 300 where the first pitch arm 312 couples with the third pitch link 307. The first pitch arm 312 couples with the blade spindle 506 of the fourth housing arm 326. Thus, the first pitch arm 312 extends past the immediately leading blade (or immediately following blade, based on the direction of rotation of the rotor hub 300 in a clockwise or counter-clockwise direction) supported by the third housing arm 324. Thus, the first pitch arm 312 controls the pitch of a blade supported by the fourth housing arm 326.

Also, the fourth pitch arm 402 extends past the fourth housing arm 326 that is immediately adjacent to the location in the rotor hub 300 where the fourth pitch arm 402 couples with the fourth pitch link 308. The fourth pitch arm 402 couples with the blade spindle 514 in the fifth housing arm 328. Thus, the fourth pitch arm 402 extends past the immediately leading blade (or immediately following blade, based on the direction of rotation of the rotor hub 300) supported by the fourth housing arm 326. The fourth pitch arm 402 controls the pitch of a blade supported by the fifth housing arm 328.

As a result of, for instance, the first pitch arm 312 coupling to the blade spindle 506 of the fourth housing arm 326, or a housing arm that is different than the immediately adjacent housing arm 324, the first pitch arm 312 passes over the fourth pitch arm 402. Along with the other pitch arms 314, 406 that are oriented to at least partially extend toward or away from the pitch links in an alternating manner, the pitch arms 312, 314, 402, 406 form the interlaced or interwoven pattern (e.g., as shown in FIG. 4). In the example of FIGS. 3-5, the extension of the pitch arms 312, 314, 316, 402, 404, 406 past the respective housing arms 320, 322, 324, 326, 328, 330 associated with an immediately leading or following blade increases the length of a moment arm provided by the respective pitch arm 312, 314, 316, 402, 404, 406 to control the pitch of a corresponding blade 400 via the movement of the pitch links 301, 303, 307, 308, 309, 311.

Figure 6:
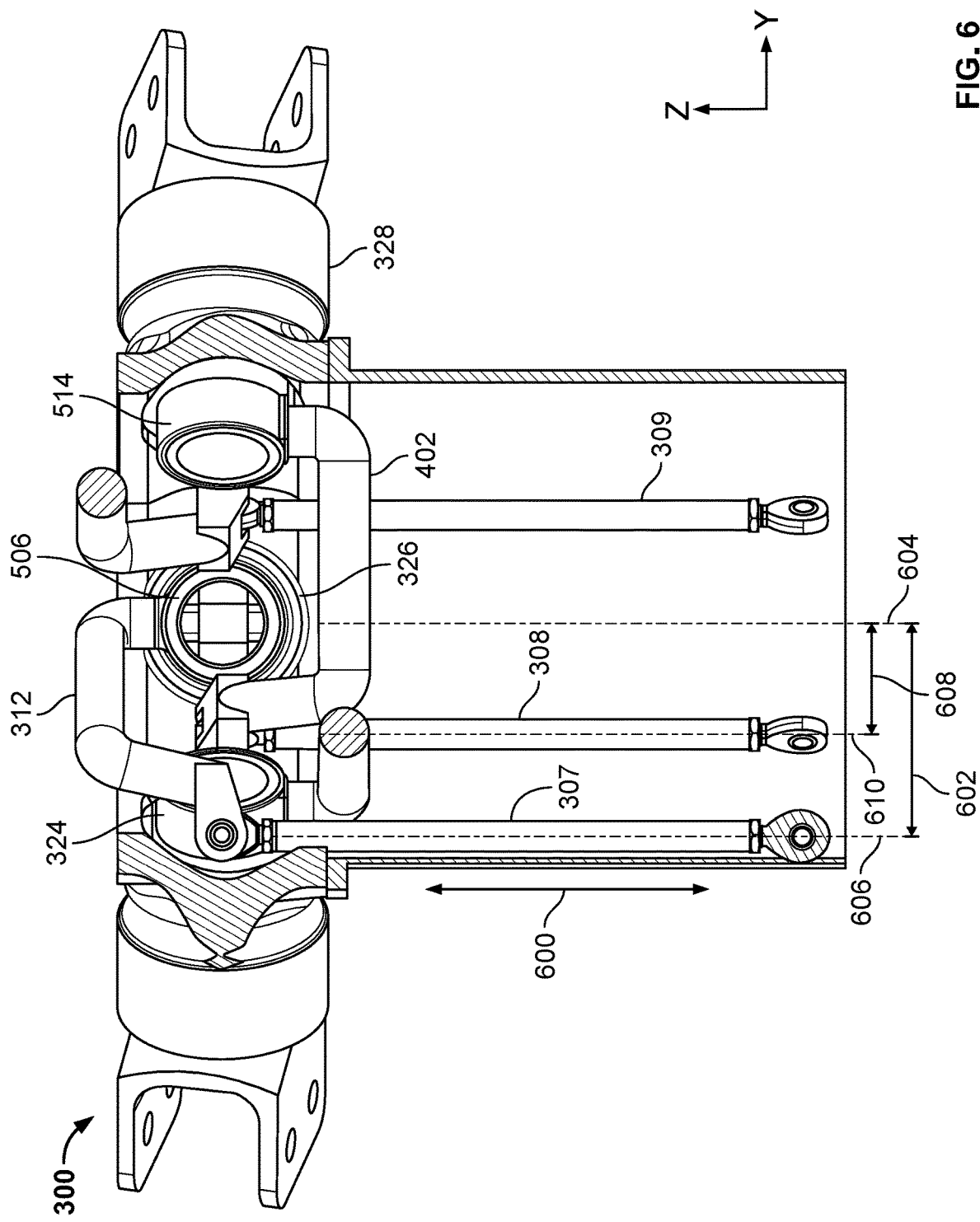
FIG. 6 is another side cutaway view of the example rotor hub of FIG. 3.

FIG. 6 is another side cutaway view of the example rotor hub 300 of FIGS. 3-5. A first arrow 600 of FIG. 6 represents the movement of the pitch links 307, 308, 309 during operation of the swashplate 315 (FIG. 3). The movement of, for example, the third pitch link 307 creates a moment via the first pitch arm 312 that is used to adjust an angle of the blade coupled to the blade spindle 506 of the fourth housing arm 326. A second arrow 602 of FIG. 6 between a first dashed line 604 and a second dashed line 606 represents the length of a moment arm of the first pitch arm 312 that controls the pitch of the blade supported by the fourth housing arm 326. As discussed above, the first pitch arm 312 extends past the immediately adjacent housing arm 324 (and, thus, the blade associated therewith) and couples with the blade spindle 506 of the fourth housing arm 326.

A third arrow 608 of FIG. 6 between the first dashed line 604 and a third dashed line 610 of FIG. 6 represents the length of a moment arm of the fourth pitch arm 402 if the fourth pitch arm 402 were coupled to the blade spindle 506 of the fourth housing arm 326, or the blade spindle of the housing arm that is immediately adjacent to the end of the fourth pitch link 308 to which the fourth pitch arm 402 is coupled. Put another away, the third arrow 608 of FIG. 6 represents the moment arm of the fourth pitch arm 402 if the fourth pitch arm 402 controlled the pitch of the immediately leading or immediately following blade supported by the fourth housing arm 326.

As shown in FIG. 6, the length of the moment arm of the first pitch arm 312 is longer than the length of the moment arm that would result if the fourth pitch arm 402 coupled to the blade spindle 506 of the immediately adjacent housing arm 326. In some examples, the interlaced configuration of the pitch arms 312, 314, 316, 402, 404, 406 of FIGS. 3-6 in which the pitch arms 312, 314, 316, 402, 404, 406 extend past the blades of the immediately adjacent housing arms 320, 322, 324, 326, 328, 330 can permit the pitch arms 312, 314, 316, 402, 404, 406 to have moment arms that are twice as long as if the pitch arms 312, 314, 316, 402, 404, 406 were used to control immediately adjacent blades (e.g., as in the known rotor hub of FIGS. 1 and 2).

The longer moment arm of the respective pitch arms 312, 314, 316, 402, 404, 406 provides for increased control over the pitch of the blades via the corresponding blade spindles. Further, the length of the moment arms of the pitch arms 312, 314, 316, 402, 404, 406 is increased without increasing the diameter of the rotor hub 300. Thus, in the examples of the FIGS. 3-6, longer moment arms can be achieved without increasing the volume of the rotor hub. In some examples, as a result of the longer moment arms and increased control over the pitch angle of the blades, axial control loads on the pitch links 301, 303, 307, 308, 309, 311 and the actuator(s) 317 of the swashplate 315 can be decreased (e.g., by 50%).

In some examples, the pitch links 301, 303, 307, 308, 309, 311 and/or the swashplate actuator(s) 317 are the least rigid components of the pitch control system with respect to material stiffness. The example interlaced pattern of pitch arms 312, 314, 316, 402, 404, 406 and resulting longer moment arm can increase torsional stiffness of the pitch control system due to the reduced axial loads on the pitch links 301, 303, 307, 308, 309, 311 and/or the swashplate actuator(s) 317. Increased torsional stiffness increases stability of the pitch control system in controlling the angle of the blades 400 of the pitch control system.

Figure 7:
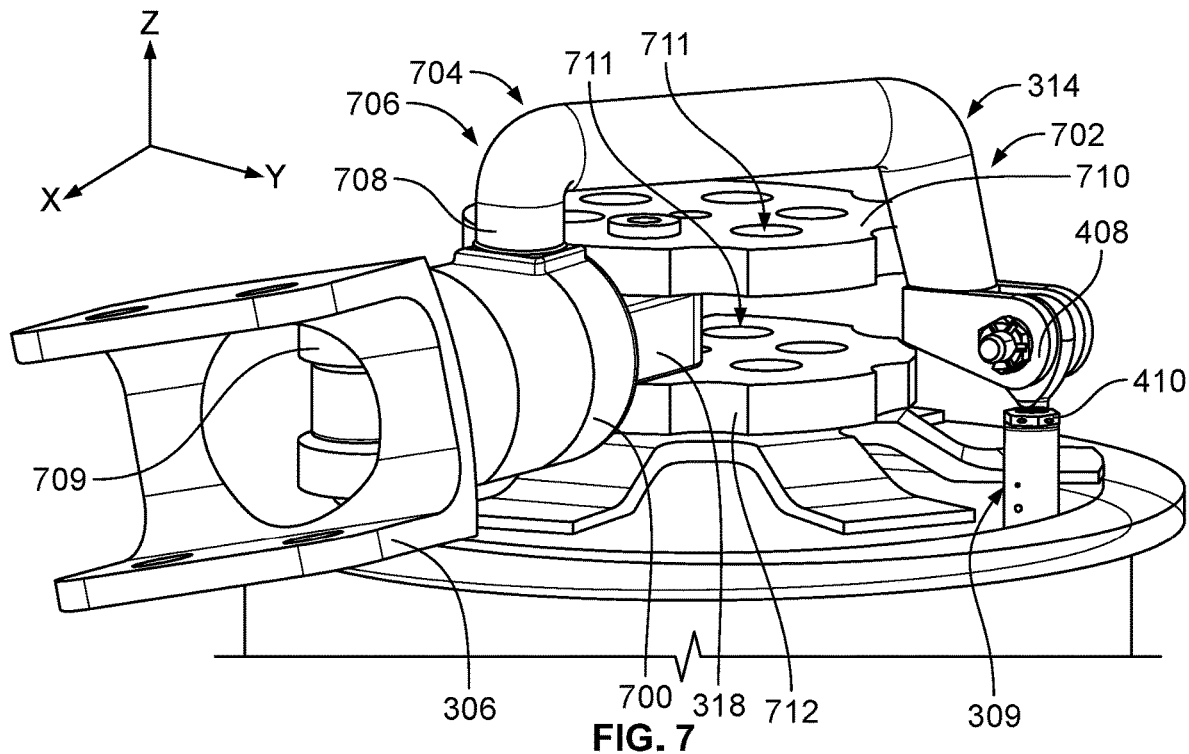
FIGS. 7 and 8 illustrate an example pitch arm of the example rotor hub of FIG. 3.
Figure 8:
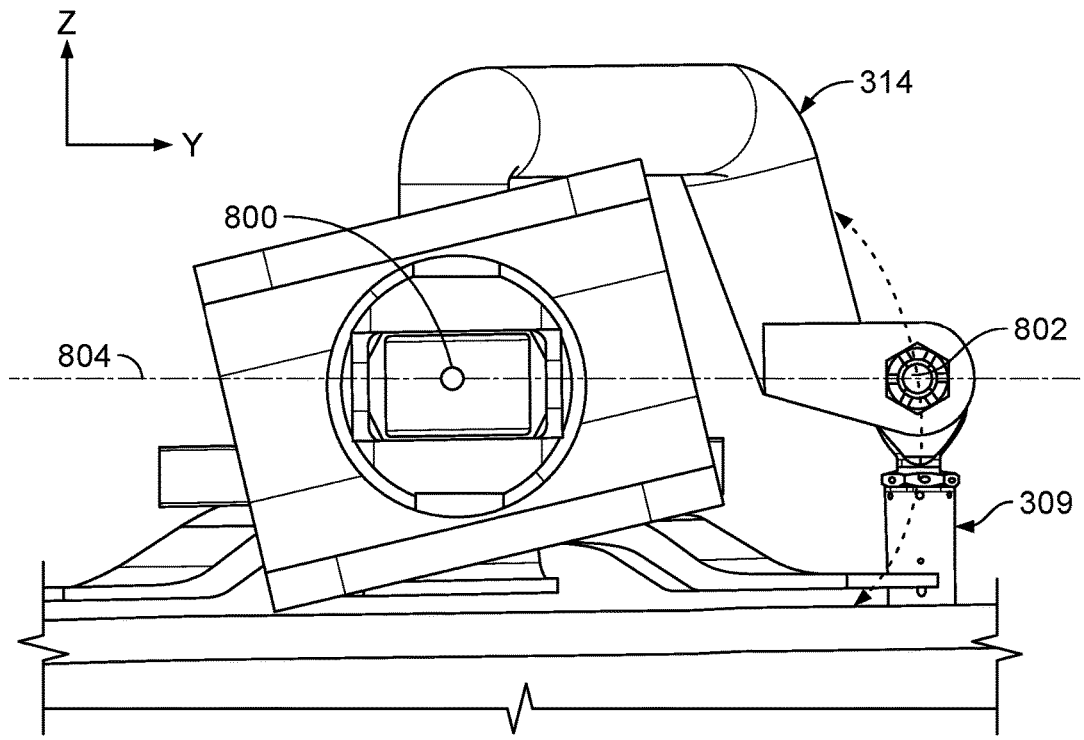

FIGS. 7 and 8 illustrate the coupling of the second pitch arm 314 of FIG. 3 to a blade spindle 700 associated with one of the blade grips 306 of the example rotor hub 300 (e.g., a blade spindle disposed in the sixth housing arm 330 of FIG. 3). For illustrative purposes in FIG. 7, the example housing 104, the other pitch arms 312, 316, 402, 404, 406, and the other blade grips 306 are not shown in FIGS. 7 and 8. Also, although the second pitch arm 314 is shown for illustrative purposes in FIGS. 7 and 8, the coupling between the first pitch arm 312 and the blade spindle 506 of the fourth housing arm 326 and/or the coupling between the third pitch arm 316 and a blade spindle of the second housing arm 322 may be same or substantially the same as shown in the example of FIGS. 7 and 8.

As illustrated in FIG. 7, the first end 408 of the second pitch arm 314 is coupled to the second end 410 of the fifth pitch link 309. A first portion 702 of the second pitch arm 314 extends substantially along the z-axis in a first direction away from the fifth pitch link 309. A second portion 704 of the second pitch arm 314 extends substantially along an x-y plane toward the blade spindle 700. A third portion 706 of the second pitch arm 314 extends in a second direction along the z-axis opposite the first direction to enable a second end 708 of the second pitch arm 314 to couple with the blade spindle 700.

In FIG. 7, one of the torsion-tension straps 318 is coupled to the blade grip 306 via a mechanical fastener 709 (e.g., a retaining nut) and retaining plates 710, 712 that include openings 711 to receive pins that couple the retaining plates 710, 712 to the torsion-tension straps as shown in FIG. 7. As shown in FIG. 7, the second pitch arm 314 extends over the torsion-tension strap 318 associated with the blade grip 306 to couple with the blade spindle 700.

FIG. 8 illustrates an example blade pitch center of rotation 800 of the blade controlled by the blade spindle 700 and a radial point 802 of the second pitch arm 314 connected to the pitch link 309. As represented by a dashed line 804 of FIG. 8, a horizontal plane extends through a blade pitch center of rotation 800 and the radial point 802 of the pitch arm 314 and the pitch link 309. Such an alignment between the pitch arm 314, the pitch link 309, and the blade spindle 700 results in symmetrical movement of the blade controlled by the blade spindle 700 when the pitch link 309 moves up and when the pitch link moves down.

FIGS. 3-8 illustrate an example rotor hub 300 in which the pitch links 301, 303, 307, 308, 309, 311 are located inside the rotor shaft 302. Also, the housing arms 320, 322, 324, 326, 328, 330 and, the blades supported by the housing arms, share a horizontal plane. However, the interlaced pattern of the pitch arms can be adapted to provide increased moment arms for differently configured rotor hubs, including rotor hubs in which the pitch links are located external to the rotor shaft or at least some of the blades are disposed on different horizontal planes.

Figure 9:
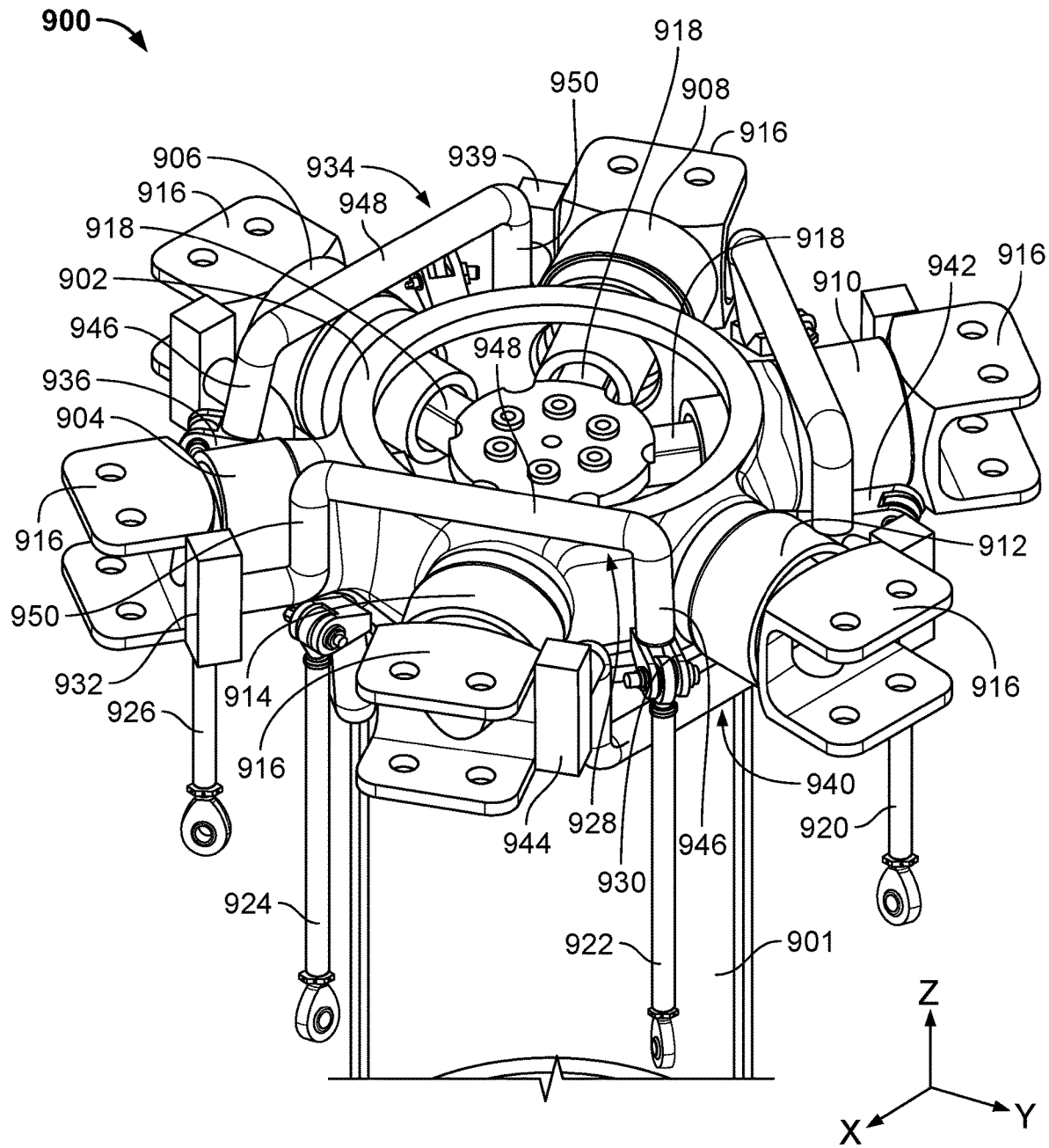
FIG. 9 illustrates another example rotor hub in accordance with teachings of this disclosure.
Figure 10:
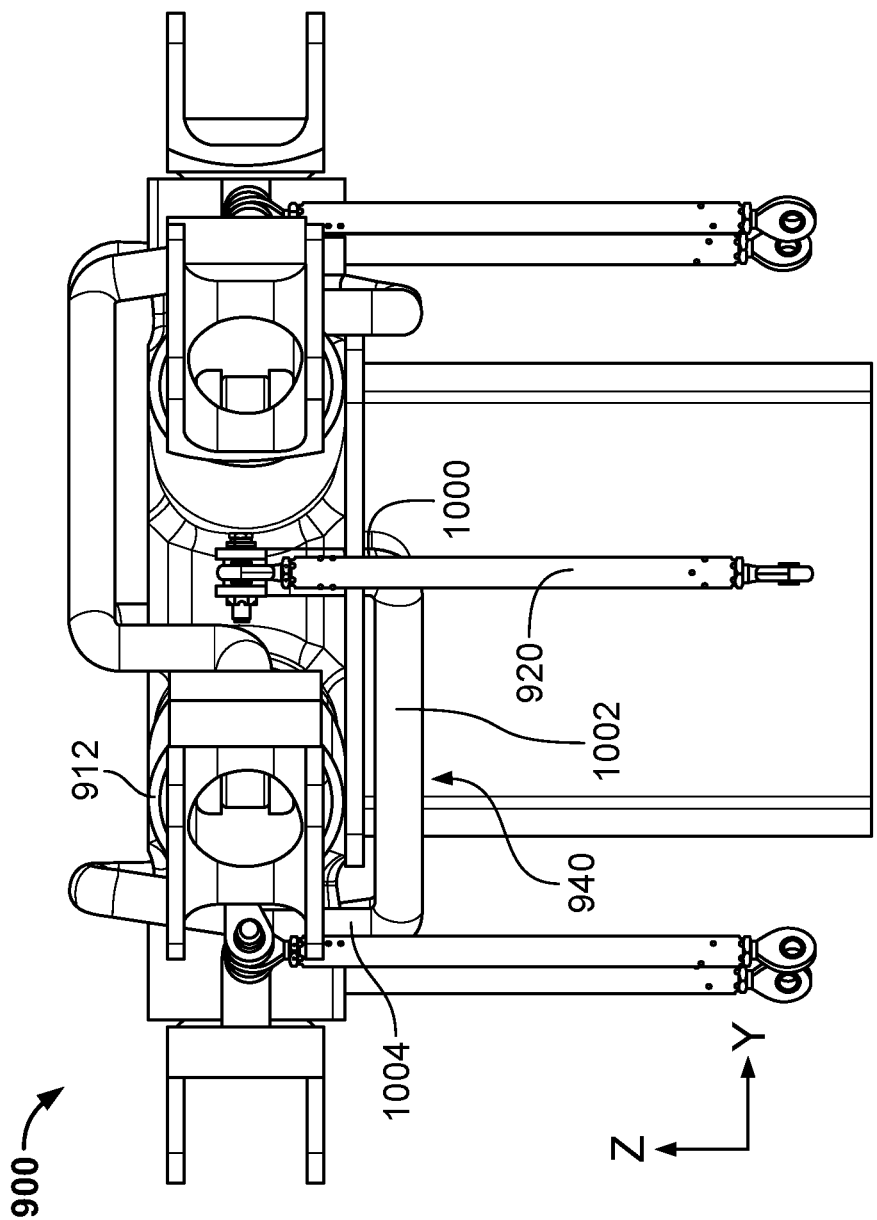
FIG. 10 is a side view of the example rotor hub of FIG. 9.
Figure 11:
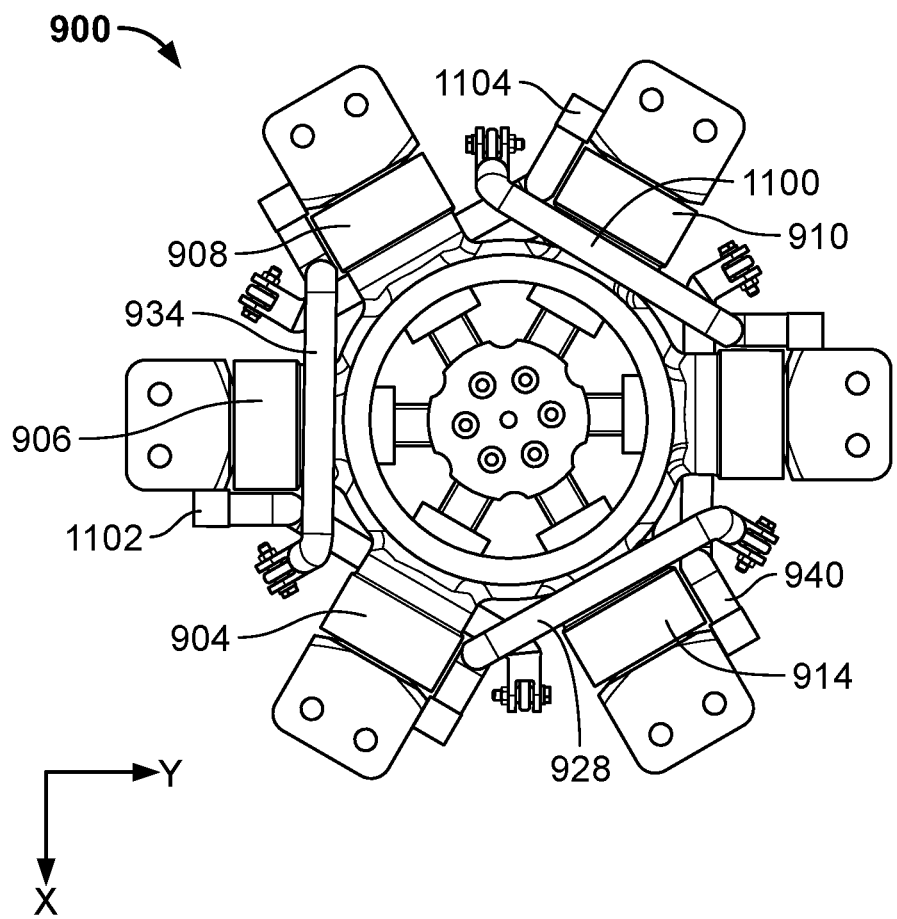
FIG. 11 is a top view of the example rotor hub of FIG. 10.

FIGS. 9-11 illustrate an example rotor hub 900 in which the pitch links are located external to a shaft 901 of the rotor hub 900. The example rotor hub 900 of FIG. 9 includes a pitch housing 902 including a first housing arm 904, a second housing arm 906, a third housing arm 908, a fourth housing arm 910, a fifth housing arm 912, and a sixth housing arm 914. Blade grips 916 are disposed in the respective housing arms 904, 906, 908, 910, 912, 914 to support blades coupled to the blade grips 916 (e.g., the blade 400 of FIG. 4). Respective torsion-tension straps 918 are coupled to the blade grips 916 as shown in FIG. 9.

The example rotor hub 900 of FIG. 9 includes six pitch links disposed external to the shaft 901, four of which are visible in FIG. 9 for illustrative purposes, namely, a first pitch link 920, a second pitch link 922, a third pitch link 924, and a fourth pitch link 926. The pitch links 920, 922, 924, 926 are coupled to a swashplate (e.g., the swashplate 315 of FIG. 3). The example rotor hub 900 of FIG. 9 can include additional or fewer blade grips, housing arms, and pitch links to support additional or fewer blades.

The example rotor hub 900 of FIG. 9 includes a plurality of pitch arms to control the pitch angle of the blades coupled to the blade grips 916. For example, the rotor hub 900 includes a first pitch arm 928 having a first end 930 coupled to the second pitch link 922 and a second end 932 coupled to the blade grip 916 of the first housing arm 904 (e.g., via one or more mechanical fasteners). The example rotor hub 900 includes a second pitch arm 934 having a first end 936 coupled to the fourth pitch link 926 and a second end 939 coupled to the blade grip 916 of the third housing arm 908. The example rotor hub 900 of FIG. 9 includes a third pitch arm 940 having a first end 942 coupled to the first pitch link 920 and a second end 944 coupled to the blade grip 916 of the sixth housing arm 914. FIG. 10 shows another view of the example third pitch arm 940 coupled to the first pitch link 920.

As shown in FIG. 9, the first pitch arm 928 extends from the second pitch link 922 and over the sixth housing arm 914 to couple with the blade grip 916 of the first housing arm 904. Also, the second pitch arm 934 extends from the fourth pitch link 926 and over the second housing arm 906 to couple with the blade grip 916 of the third housing arm 908. As shown in FIGS. 9 and 10, the third pitch arm 940 extends from the first pitch link 920 and under the fifth housing arm 912 to couple with the blade grip 916 of the fifth housing arm 914.

Thus, the pitch arms 928, 934, 940 of the example rotor hub 900 of FIG. 9 do not couple with the blade grip 916 that is immediately adjacent the respective pitch links 920, 922, 926 to which the pitch arms 928, 934, 940 are coupled. Rather, as in the example rotor hub 300 of FIGS. 3-8, the pitch arms 928, 934, 940 of the example rotor hub 900 of FIG. 9 control pitch of a blade that is different than the immediately leading or immediately following blade adjacent to the pitch link to which the pitch arm 928, 934, 940 is coupled.

The extension of the pitch arms 928, 934, 940 past the immediately adjacent blade grips 916 increases the length of a moment arm of the respective pitch arms 928, 934, 940 as compared to if the pitch arms 928, 934, 940 controlled the immediately leading or immediately following blade. Thus, the pitch arms 928, 934, 940 of the example rotor hub 900 provide for increased control of the pitch of the blades via the blade grips 916. Further, the pitch arms 928, 934, 940 are disposed within the existing footprint of the rotor hub 900 including the external pitch links 920, 922, 924, 926 and, thus, do not increase a size of the rotor hub 900.

To extend the pitch arms of the example rotor hub 900 past the immediately adjacent blade grip 916, the pitch arms of the example rotor hub 900 are arranged in an interwoven pattern in which alternating ones of the pitch arms extend over, under, and/or around the housing arms 904, 906, 908, 910, 912, 914. Referring to FIG. 11, the example rotor hub 900 includes three pitch arms 928, 934, 1100 that extend over respective immediately adjacent housing arms 914, 906, 910 and three pitch arms 940, 1102, 1104 that extend under respective immediately adjacent housing arms 912, 904, 908.

Referring again to FIG. 9, the pitch arms 928, 934, 1100 that extend over the housing arms 914, 906, 910 include first portions 946 that extend in a first direction substantially along a z-axis away from the pitch links 920, 922, 924, 926, second portions 948 that extend substantially along an x-y plane over the housing arms 914, 906, 910, and third portions 950 that extend in a second direction along the z-axis opposite the first direction and toward the blade grips 916 to enable the pitch arms 928, 934, 1100 to couple with the blade grips. Referring to FIG. 10, the pitch arm 940 that extends under the housing arm 912 includes a first portion 1000 that extends in a first direction substantially along the z-axis toward the pitch link 920, a second portion 1002 that extends substantially along the x-y plane under the housing arm 912, and a third portion 1004 that extends in a second direction opposite the first direction along the z-axis away from the pitch link 920 to enable the pitch arm 940 to couple with the blade grip 916 of the sixth housing arm 914. In the example of FIGS. 9 and 10, the z-axis extends parallel to a longitudinal axis of the shaft 901. Thus, the example pitch arms 928, 934, 940 can be at least partially U-shaped or C-shaped or include substantially U-shaped or C-shaped portions. The alternating orientation of the pitch arms 928, 934, 940, 1100, 1102, 1104 with respect to extending over or under the housing arms 904, 906, 908, 910, 912, 914 creates the interweaved or interlaced pattern shown in FIG. 11.

Figure 12:
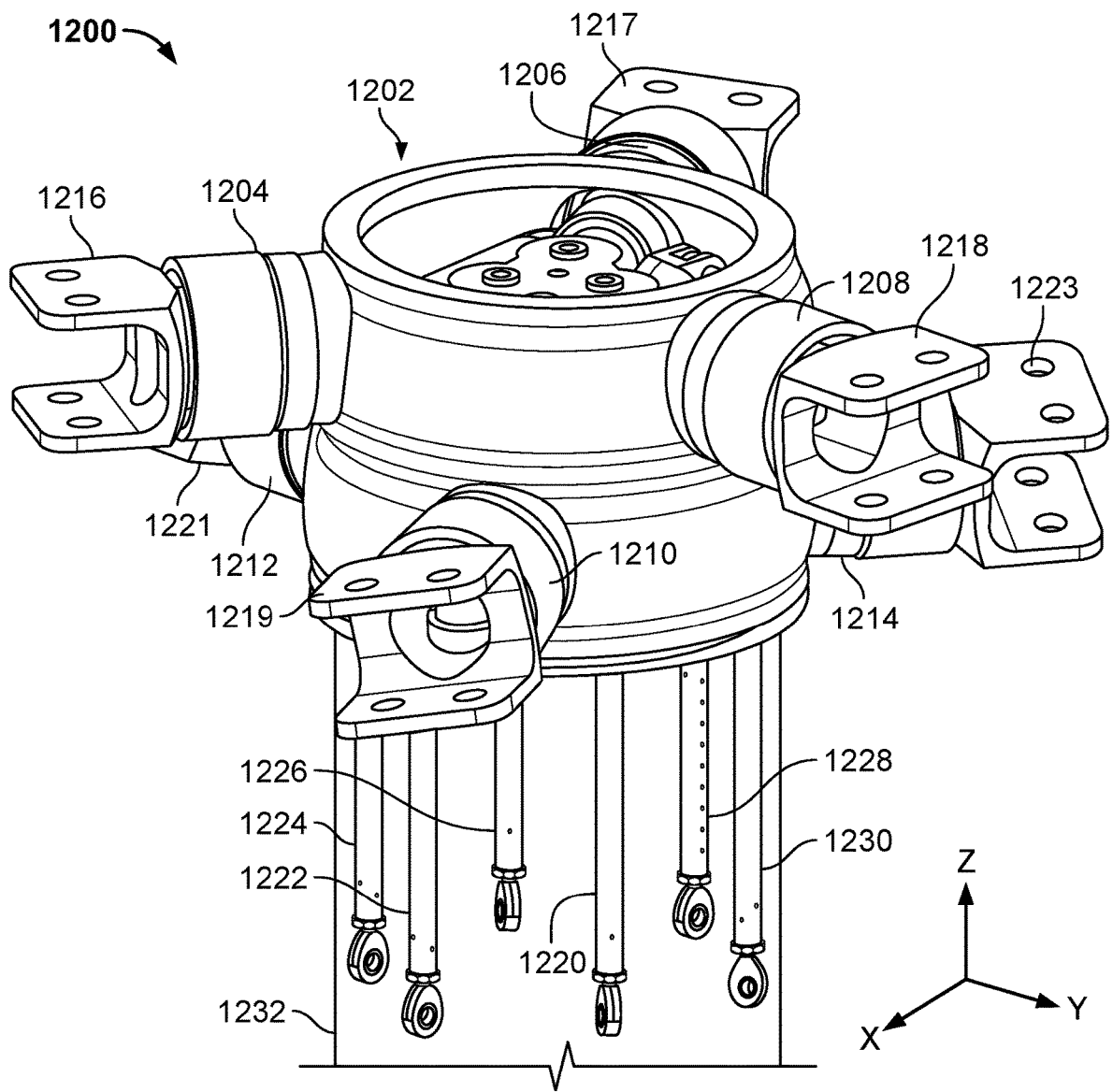
FIG. 12 illustrates another example rotor hub in accordance with teachings of this disclosure.
Figure 13:
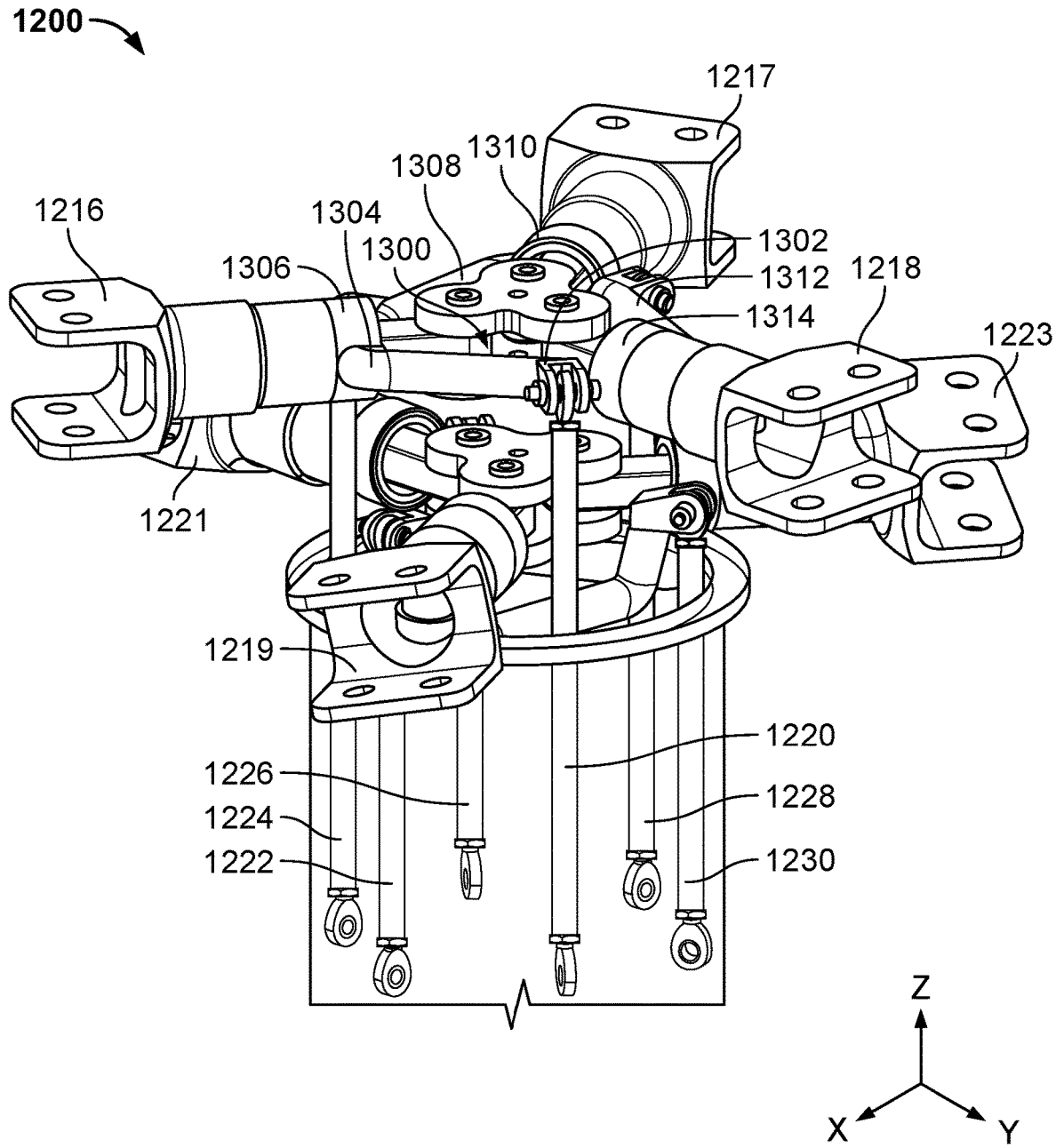
FIG. 13 illustrates the example rotor hub of FIG. 12, where the housing of the rotor hub has been removed.
Figure 14:
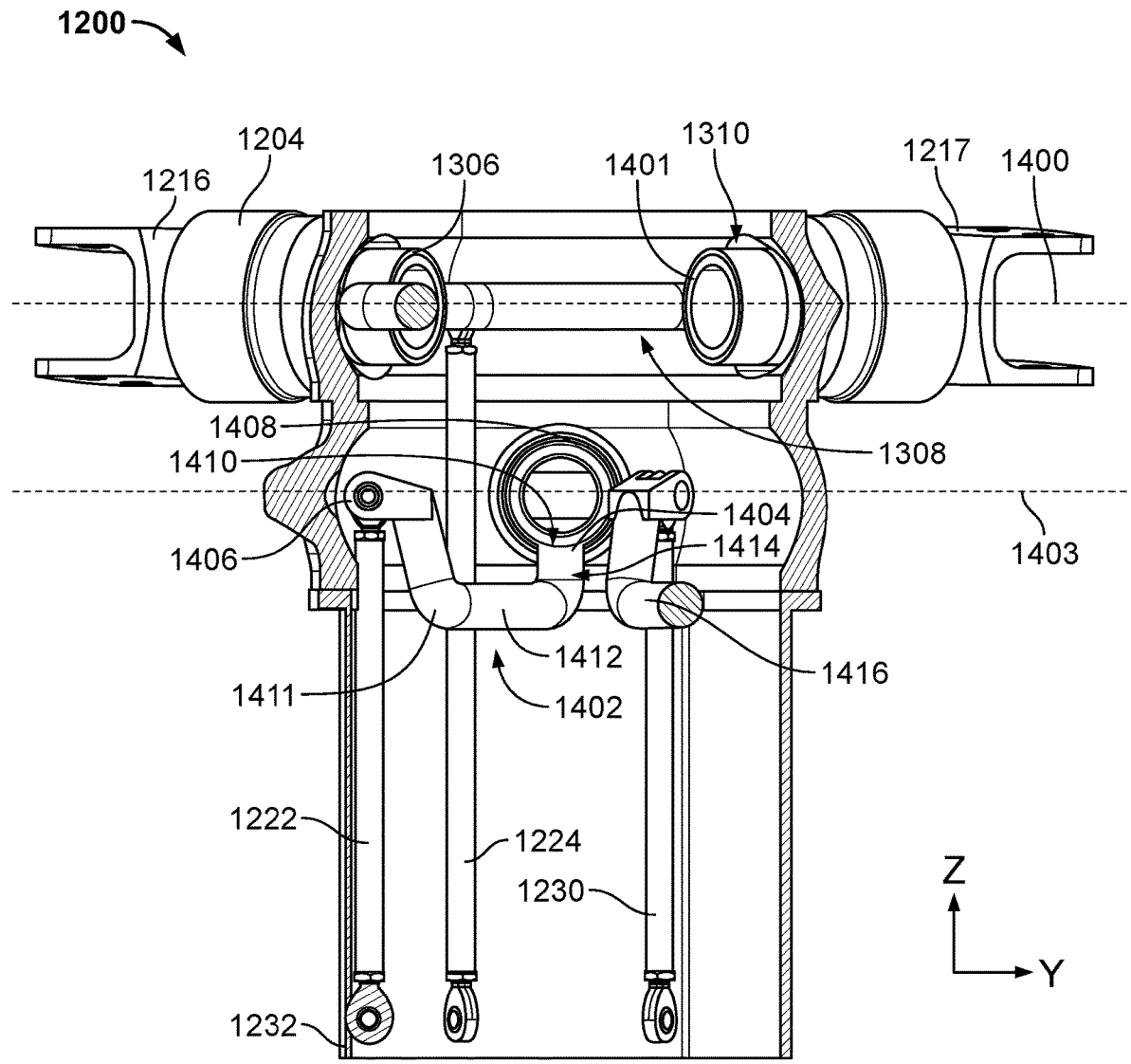
FIG. 14 is a side view of the example rotor hub of FIG. 12.

FIGS. 12-14 illustrate another example rotor hub 1200 in which one or more of the blades supported by the rotor hub 1200 are disposed in different planes. As shown in FIG. 12, the example rotor hub 1200 includes a pitch housing 1202 including six housing arms, where a first housing arm 1204, a second housing arm 1206, and a third housing arm 1208 are disposed in a first plane and a fourth housing arm 1210, a fifth housing arm 1212, and a sixth housing arm 1214 are disposed in a second plane. In the example of FIG. 12, the second plane is disposed below the first plane. Each of the housing arms 1204, 1206, 1208, 1210, 1212, 1214 includes respective first, second, third, fourth, fifth, and sixth blade grips 1216, 1217, 1218, 1219, 1221, 1223 disposed therein to support respective blades (e.g., the blade 400 of FIG. 4). The example rotor hub 1200 includes a first pitch link 1220, a second pitch link 1222, a third pitch link 1224, a fourth pitch link 1226, a fifth pitch link 1228, and a sixth pitch link 1230 disposed in a rotor shaft 1232. The pitch links 1220, 1222, 1224, 1226, 1228, 1230 are coupled to a swashplate (e.g., the swashplate 315 of FIG. 3).

FIG. 13 illustrates the example rotor hub 1200 of FIG. 12, where the pitch housing 1202 has been removed for illustrative purposes. As shown in FIG. 13, the first, third, and fifth pitch links 1220, 1224, 1228 have a first height to substantially align with the first, second, and third blade grips 1216, 1217, 1218 in the first plane. The second, fourth, and sixth pitch links 1222, 1226, 1230 have a second height less than first height to substantially align with the fifth, sixth, and fourth blade grips 1221, 1223, 1219, respectively, in the second plane.

The example rotor hub 1200 of FIGS. 12 and 13 includes a first pitch arm 1300 having a first end 1302 coupled to the first pitch link 1220 and a second end 1304 coupled to a first blade spindle 1306, where the first blade spindle 1306 is coupled to the first blade grip 1216 (e.g., of the first housing arm 1204 of FIG. 12).

As shown in FIG. 13, to couple with the blade spindle 1306, the first pitch arm 1300 extends over the fourth blade grip 1219 that is located in the second or lower plane of the rotor hub 1200. Thus, the length of the moment arm of the first pitch arm 1300 is increased as compared to if the pitch link 1220 and the first pitch arm 1300 were used to control the pitch of a blade supported by, for instance, the third blade grip 1218 or the fourth blade grip 1219 (i.e., a blade grip that is in closer proximity to the first pitch link 1220 than the blade grip 1216).

The example rotor hub 1200 of FIG. 13 includes a second pitch arm 1308 coupled to the third pitch link 1224 and a second blade spindle 1310 of the second blade grip 1217. The second pitch arm 1308 extends over the fifth blade grip 1221 to increase the length of the moment arm provided by the second pitch arm 1308. The example rotor hub 1200 of FIG. 13 includes a third pitch arm 1312 coupled to the fifth pitch link 1228 and a third blade spindle 1314 of the third blade grip 1218. The third pitch arm 1312 extends over the sixth blade grip 1223 to increase the length of the moment arm provided by the third pitch arm 1312. The second and third pitch arms 1308, 1312 are coupled to the respective pitch links 1224, 1228 and the blade spindles 1310, 1314 substantially as disclosed above in connection with the first pitch arm 1300.

FIG. 14 is a side cutaway view of the example rotor 1200. As shown in FIG. 14, the second pitch arm 1308 extends across the rotor hub 1200 from the third pitch link 1224 to the second blade spindle 1310 associated with the second blade grip 1217. As represented by a first dashed line 1400 in FIG. 14, a radial point at which the second pitch arm 1308 couples to the third pitch link 1224 is substantially aligned with a center of rotation of the blade controlled by the second blade spindle 1310 as disclosed in connection with FIG. 8, above.

In the example of FIG. 14, the second pitch arm 1308 extends from the third pitch link 1224 across the rotor hub to the couple with a side 1401 of the second blade spindle 1310 without substantial changes in height of the second pitch arm 1308 along a z-axis (where the z-axis extends parallel to a longitudinal axis of the shaft 1232). Put another away, in the example of FIG. 14, the second pitch arm 1308 does not include portions that extend toward or away from the pitch links along the z-axis as in the example pitch arms of FIGS. 3-11. In some other examples, the second pitch arm 1308 includes portions that extend substantially along the z-axis toward or away from the pitch links (e.g., based on the portion of the second blade spindle 1310 to which the second pitch arm 1308 couples).

The example rotor hub 1200 of FIGS. 12-14 includes pitch arms to control the blades disposed in the second or lower plane. For instance, the example rotor hub 1200 includes a fourth pitch arm 1402 having a first end 1406 coupled to the second pitch link 1222 and a second end 1404 coupled to a fourth blade spindle 1408 (associated with the fifth blade grip 1221). In the example of FIG. 14, the fourth pitch arm 1402 is coupled to a bottom portion 1410 of the fourth blade spindle 1408. As such, the example fourth pitch arm 1402 includes a first portion 1411 that extends in a first direction substantially along the z-axis toward the pitch links 1222, 1224, 1230, a second portion 1412 that extends substantially along an x-y plane, and a third portion 1414 that extends in a second direction opposite the first direction along the z-axis away from the pitch links 1222, 1224, 1230. Thus, the example pitch arm 1402 of the second or lower plane can be at least partially U-shaped or C-shaped or include substantially U-shaped or C-shaped portions. As represented by a second dashed line 1403 of FIG. 14, a radial point at which the fourth pitch arm 1402 couples to the second pitch link 1222 is substantially aligned with a center of rotation of the blade controlled by the fourth blade spindle 1408 as disclosed in connection with FIG. 8, above.

The fourth pitch arm 1402 extends under the blade spindle 1306 of the first housing arm 1204. As a result, the example fourth pitch arm 1402 provides for a longer moment arm for controlling blade pitch than if the fourth pitch arm 1402 were used to control the pitch of a blade immediately adjacent the second pitch link 1222. As shown in FIG. 14, in some examples, the first portion 1411 of the fourth pitch arm 1402 is angled inward relative to the rotor shaft 1232 so as not to interfere with both the second pitch link 1222 and the third pitch link 1224 as the fourth pitch arm 1402 extends to the fourth blade spindle 1408. The example rotor hub 1200 includes a pitch arm coupled to the fourth pitch link 1226 (FIG. 13) and a pitch arm 1416 coupled to the sixth pitch link 1230, as partially shown in FIG. 14 and substantially as disclosed in connection with the fourth pitch arm 1402.

Although in the examples of FIGS. 3-14, the pitch arms extend from the corresponding pitch links in a clockwise manner when viewed from above over, under, or around components of the rotor hub such as the tension-torsion straps and/or other pitch arms, in some examples, the pitch arms extend from the corresponding pitch links in a counter-clockwise manner when viewed from above over, under, or around components of the rotor hub such as the tension-torsion straps. Thus, the pitch arms and/or the arrangement of the pitch arms can differ from the examples illustrated herein.

Figure 15:
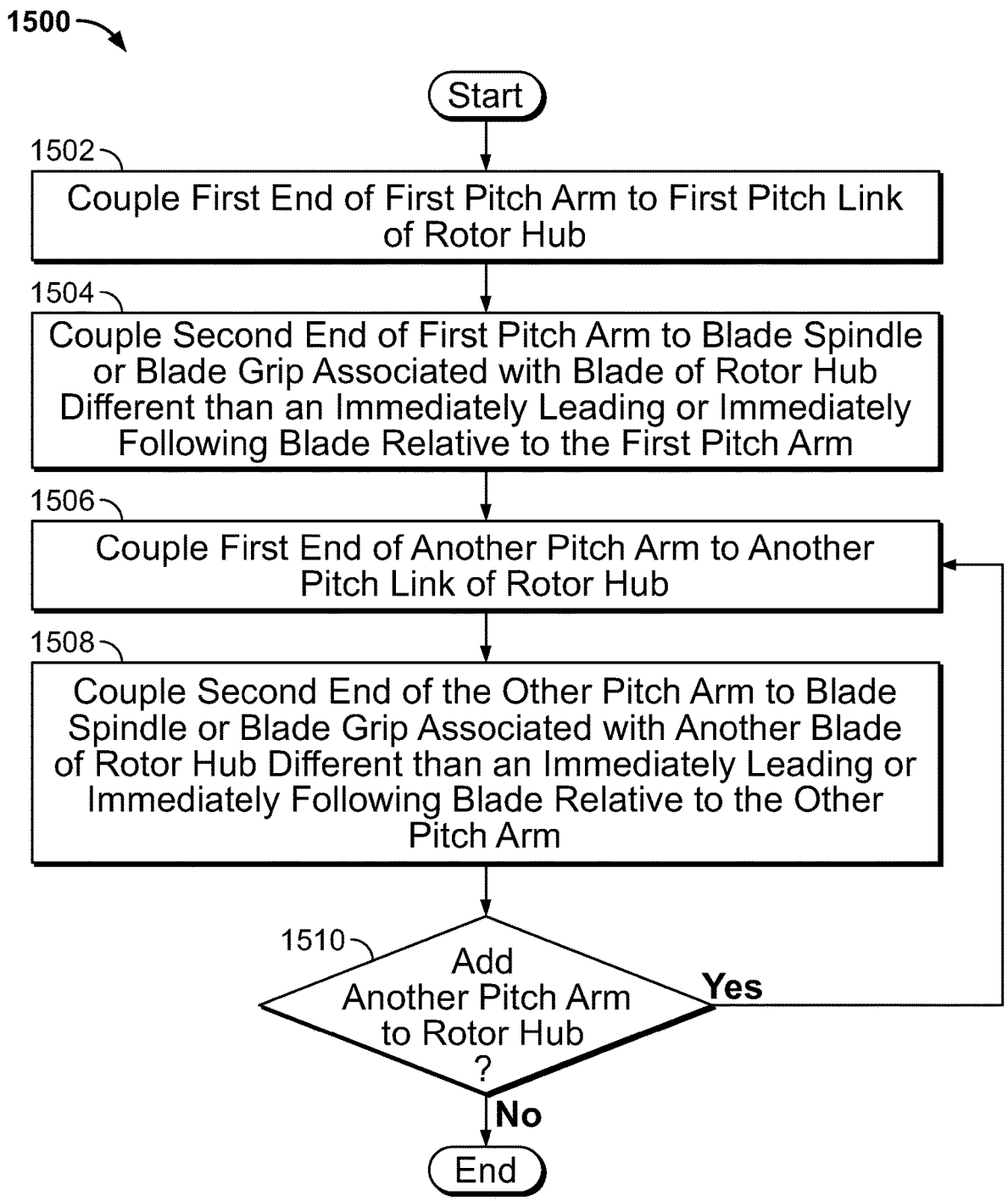
FIG. 15 is a flowchart of an example method to manufacture a rotor hub including pitch arms arranged in an interlaced pattern in accordance with teachings of this disclosure.

FIG. 15 is a flowchart of an example method to manufacture a rotor hub including pitch arms arranged in an interlaced pattern in accordance with teachings of this disclosure. The example method 1500 begins with coupling a first end of a first pitch arm to a first pitch link of a rotor hub (block 1502). For example, a first end 408, 930, 1302 of a first pitch arm 312, 314, 316, 402, 406, 928, 934, 940, 1100, 1102, 1104, 1300, 1308, 1312, 1402, 1416 can be coupled to a first end 410 of a first pitch link 301, 303, 307, 308, 309, 311, 920, 922, 924, 926, 1220, 1222, 1224, 1226, 1228, 1230 of the example rotor hub 300, 900, 1200 of FIGS. 3-14.

The example method 1500 of FIG. 15 includes coupling a second end of the first pitch arm to a blade spindle or a blade grip associated with a blade of the rotor hub, where the blade is different than an immediately leading or immediately following blade relative to the first pitch arm (block 1504). In some examples, the second end of the first pitch arm is coupled to the blade spindle if the pitch links are disposed inside the rotor shaft. In other examples, the second end of the first pitch arm is coupled (e.g., directly coupled) to the blade grip if the pitch links are disposed external to the rotor shaft. Coupling the second end of the pitch arm to the blade spindle or the blade grip associated the blade that is different than an immediately leading or immediately following blade relative to the pitch arm can result in the pitch arm extending over or under one or more components of the rotor hub, such as the tension-torsion straps 318, 918.

For example, a second end 504 of the first pitch arm 312 of the example rotor hub 300 of FIGS. 3-8 couples with the blade spindle 506 of the fourth housing arm 326, which is different than the blade spindle associated with the immediately leading (or following) blade 400 relative to the first pitch arm 312 and disposed in the second housing arm 324. As another example, a second end 932 of the first pitch arm 928 of the example rotor hub 900 of FIG. 9 couples with the blade grip 916 of the first housing arm 904, where the pitch link 922 to which the first end 930 of the first pitch arm 928 couples is located external to the housing 902 of the rotor hub 900. The blade associated with the blade grip 916 of the first housing arm 904 is different than the blade that is an immediately leading or immediately following blade relative to the first pitch arm 928 of FIG. 9 and supported by the sixth housing arm 914.

The example method 1500 of FIG. 15 includes coupling a first end of another pitch arm to another pitch link of the rotor hub (block 1506). For example, a first end 408, 930, 1302 of another one of the pitch arms 312, 314, 316, 402, 406, 928, 934, 940, 1100, 1102, 1104, 1300, 1308, 1312, 1402, 1416 can be coupled to a first end 410 of another one of the pitch links 301, 303, 307, 308, 309, 311, 920, 922, 924, 926, 1220, 1222, 1224, 1226, 1228, 1230 of the example rotor hub 300, 900, 1200 of FIGS. 3-14.

The example method 1500 of FIG. 15 includes coupling a second end of the other pitch arm to a blade spindle or a blade grip associated with another blade of the rotor hub, where the other blade is different than an immediately leading or immediately following blade relative to the (other) pitch arm (block 1508). Coupling the second end of the pitch arm to the blade spindle or the blade grip associated the blade that is different than an immediately leading or immediately following blade relative to the pitch arm can result in the pitch arm extending over or under one or more components of the rotor hub, such as the tension-torsion straps 318, 918 and/or other pitch arms.

For example, the fourth pitch arm 402 of the example rotor hub 300 of FIGS. 3-8 couples with the blade spindle 514 of the fifth housing arm 328, which is different than the blade spindle associated with the immediately leading (or following) blade 400 relative to the fourth pitch arm 402 and disposed in the fourth housing arm 326. As shown in FIGS. 4 and 5, the fourth pitch arm 402 extends under the first pitch arm 312 and the tension-torsion straps 318 to couple with the blade spindle 514 of the fifth housing arm 328. As another example, a second end 944 of the third pitch arm 940 of the example rotor hub 900 of FIG. 9 couples with the blade grip 916 of the sixth housing arm 914, where the pitch link 920 to which the first end 942 of the third pitch arm 940 couples is located external to the housing 902 of the rotor hub 900. The blade associated with the blade grip 916 of the sixth housing arm 914 is different than the blade that is an immediately leading or immediately following blade relative to the third pitch arm 940 of FIG. 9 and supported by the fifth housing arm 912. As shown in FIG. 9, the third pitch arm 940 extends under the fifth housing arm 912 to couple with the blade grip 916 of the sixth housing arm 914.

The example method 1500 of FIG. 15 continues with coupling pitch arms to the pitch links and the blade spindles or blade grips as discussed at blocks 1506 and 1508 until no further pitch arms are to be added (block 1510).

Although the example method 1500 is described with reference to the flowchart illustrated in FIG. 15, many other methods of manufacturing a rotor hub including interlaced pitch arms may alternatively be used. For example, the order of execution of the blocks may be changed, and/or some of the blocks described may be changed, eliminated, or combined. Similarly, additional operations may be included in the example method of FIG. 15 before, in between, or after the blocks shown in FIG. 15.

From the foregoing, it will be appreciated that example apparatus, methods, and articles of manufacture have been disclosed that provide for increased control of the pitch angle of a blade of a rotor hub. Example rotor hubs disclosed herein include pitch arms disposed in an interlaced or interwoven pattern such that the pitch arms extend over or under one another and/or other components of the rotor hub, such as the tension-torsion straps, to control a corresponding blade that is different than an immediately leading or immediately following blade. In examples disclosed herein, the interlaced arrangement of the pitch arms and extension of the pitch arms throughout the rotor hub enables a moment arm provided by each pitch arm to be lengthened as compared to if the respective pitch arms controlled a blade immediately adjacent to a pitch link to which each pitch arm is coupled. As a result, example rotor hubs disclosed herein provide for increased control over the blade pitch angle, reduce loads on the blade pitch control system, and improve stability of the blade pitch control system without increasing or substantially increasing the size of the rotor hub.

An example apparatus includes a housing including a first housing arm to support a first blade grip and a first blade spindle and a second housing arm to support a second blade grip and a second blade spindle. The example apparatus includes a first pitch link and a second pitch link. The example apparatus includes a first pitch arm coupled to the first pitch link and one of the first blade grip or the first blade spindle. The example apparatus includes a second pitch arm coupled to the second pitch link and one of the second blade grip or the second blade spindle. The second pitch arm is to extend past the first housing arm to couple with the one of the second blade grip or the second blade spindle.

In some examples, a first portion of the first pitch arm extends from the first pitch link in a first direction relative to the first pitch link and the second pitch link and at a first portion of the second pitch arm extends from the second pitch link in a second direction relative to the first pitch link and the second pitch link, the first direction opposite the second direction.

In some examples, a second portion of the first pitch arm extends in the second direction and a second portion of the second pitch arm extends in the first direction.

In some examples, the first pitch link and the second pitch link are external to the housing.

In some examples, the apparatus further includes a tension-torsion strap coupled to the first blade grip. The first pitch arm is to extend over the tension-torsion strap to couple with the one of the first blade grip or the first blade spindle.

In some such examples, the second pitch arm is to extend under the tension-torsion strap.

In some examples, the first housing arm is disposed on a first plane and the second housing arm is disposed on a second plane different from the first plane.

In some examples, at least a portion of the first pitch arm is disposed in the first plane and at least a portion of the second pitch arm is disposed in the second plane.

An example apparatus includes a housing including a first housing arm to support a first blade and a second housing arm to support a second blade; a first pitch arm coupled to a first pitch link and extending to the first housing arm, the first pitch arm to cause a change of a pitch angle of the first blade; and a second pitch arm coupled to a second pitch link and extending to the second housing arm. The second pitch arm is to cause a change of a pitch angle of the second blade. The first pitch link is spaced apart from the first housing arm by the second housing arm.

In some examples, the first pitch arm is coupled to a first blade spindle disposed in the first housing arm and the second pitch arm is coupled to a second blade spindle disposed in the second housing arm.

In some examples, the first pitch arm is to couple to a first portion of the first blade spindle and the second pitch arm is to couple to a second portion of the second blade spindle different from the first portion of the first blade spindle.

In some examples, a first portion of the first pitch arm proximate to the first pitch link is to extend in a first direction relative to the first pitch link and a second portion of the first pitch arm proximate to the first blade spindle is to extend in a second direction relative to the first pitch link, the first direction opposite the second direction.

In some examples, the first pitch link is external to the housing.

In some examples, the first pitch arm is external to the housing.

In some examples, the apparatus further includes a tension-torsion strap. A portion of the first pitch arm is to extend from the first pitch link in a first direction relative to the tension-torsion strap and a portion of the second pitch arm is to extend from the second pitch link in a second direction relative to the tension-torsion strap, the first direction opposite the second direction.

In some examples, the apparatus further includes a third pitch arm coupled to a third pitch link, a portion of the third pitch arm to extend in the first direction relative to the tension-torsion strap.

Another example rotor hub includes a first pitch link and a second pitch link. At least a portion of an end of the first pitch link and an end of the second pitch link are disposed in a plane. The example rotor hub includes a first pitch arm having a first end coupled to the end of the first pitch link. A first portion of the first pitch arm is to extend from the end of the first pitch link in a first direction relative to the plane. The example rotor hub includes a second pitch arm having a first end coupled to the end of the second pitch link. A first portion of the second pitch arm is to extend from the end of the second pitch link in a second direction relative to the plane. The first direction is opposite the second direction.

In some examples, the rotor hub further includes a blade spindle. A second end of the first pitch arm is coupled to the blade spindle.

In some examples, a second portion the first pitch arm is to extend in the first direction. The second portion of the first pitch arm is to couple with the blade spindle.

In some examples, the rotor hub further includes a third pitch link and a third pitch arm. At least a portion of the third pitch arm is to extend from an end of the third pitch link in one of the first direction or the second direction.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a housing including:
        a first housing arm supporting a first blade grip and a first blade spindle; and
        a second housing arm supporting a second blade grip and a second blade spindle;
    a shaft coupled to the housing;
    a first pitch link and a second pitch link;
    a first pitch arm, a first end of the first pitch arm coupled to the first pitch link and a second end of the first pitch arm coupled to one of the first blade grip or the first blade spindle, a plane passing through the first end of the first pitch arm and a central axis about which a blade coupled to the first blade grip rotates, the plane extending perpendicular to a longitudinal axis of the shaft when the first pitch link is in a first position;
    a tension-torsion strap coupled to the first blade grip, the first pitch arm extending over the tension-torsion strap to couple with the one of the first blade grip or the first blade spindle; and
    a second pitch arm coupled to the second pitch link and one of the second blade grip or the second blade spindle, the second pitch arm to extend past the first housing arm to couple with the one of the second blade grip or the second blade spindle.

2. The apparatus of claim 1, wherein a first portion of the first pitch arm extends from the first pitch link in a first direction relative to the first pitch link and the second pitch link and a first portion of the second pitch arm extends from the second pitch link in a second direction relative to the first pitch link and the second pitch link, the first direction opposite the second direction.

3. The apparatus of claim 2, wherein a second portion of the first pitch arm extends in the second direction and a second portion of the second pitch arm extends in the first direction.

4. The apparatus of claim 1, wherein the second pitch arm extends under the tension-torsion strap.

5. An apparatus comprising:
    a housing including a first housing arm to support a first blade and a second housing arm to support a second blade;
    a shaft, a plane passing through the housing, the plane extending perpendicular to a longitudinal axis of the shaft;
    a first pitch link and a second pitch link, the first pitch link spaced apart from the first housing arm by the second housing arm;
    a first tension-torsion strap coupled to the first blade, a portion of the first tension-torsion strap disposed outside of the first housing arm;

a first pitch arm coupled to the first pitch link and extending to the first housing arm, the first pitch arm to cause a change of a pitch angle of the first blade, the first pitch arm including a first segment extending in a first direction relative to the plane, a second segment extending in a second direction relative to the plane, and a third segment extending in the first direction relative to the plane, the first direction different than the second direction, the second segment disposed between the first segment and the third segment, at least a portion of the second segment of the first pitch arm extending over the portion of the first tension-torsion strap disposed outside of the first housing arm; and a second pitch arm coupled to the second pitch link and extending to the second housing arm, the second pitch arm to cause a change of a pitch angle of the second blade, a portion of the second pitch arm extending under the portion of the first tension-torsion strap disposed outside of the first housing arm.

6. The apparatus of claim 5, wherein the first pitch arm is coupled to a first blade spindle disposed in the first housing arm and the second pitch arm is coupled to a second blade spindle disposed in the second housing arm.

7. The apparatus of claim 6, wherein the first pitch arm is coupled to a portion of the first blade spindle and the second pitch arm is coupled to a portion of the second blade spindle, the portion of the second blade spindle different than the portion of the first blade spindle.

8. The apparatus of claim 6, wherein the first segment of the first pitch arm is proximate to the first pitch link and the third segment of the first pitch arm is proximate to the first blade spindle.

9. The apparatus of claim 5, further including a third pitch arm coupled to a third pitch link, a portion of the third pitch arm extending in the first direction relative to the plane.

10. A rotor hub comprising:
a shaft;
a first pitch link;
a second pitch link, at least a portion of an end of the first pitch link and at least a portion of an end of the second pitch link disposed in a first plane when the first pitch link and the second pitch link are in a first position;
a first pitch arm having a first end, a second end, a first portion, a second portion, and a third portion, the first end of the first pitch arm coupled to the end of the first pitch link, the first portion of the first pitch arm extending from the end of the first pitch link in a first direction relative to the first plane, a second plane passing through the second portion of the first pitch arm;
a second pitch arm having a first end, a first portion and a second portion, the first end of the second pitch arm coupled to the end of the second pitch link, the first portion of the second pitch arm extending from the end of the second pitch link in a second direction relative to the first plane, a third plane passing through the second portion of the second pitch arm,
the first direction opposite the second direction,
the first plane disposed between the second plane and the third plane, each of the first plane, the second plane, and the third plane extending perpendicular to a longitudinal axis of the shaft when the first pitch link and the second pitch link are in the first position; and
a blade spindle, the second end of the first pitch arm coupled to the blade spindle, the third portion of the first pitch arm extending from the second portion of the first pitch arm in the second direction to couple the second end of the first pitch arm with the blade spindle.

11. The rotor hub of claim 10, further including a third pitch link and a third pitch arm, at least a portion of the third pitch arm extending from an end of the third pitch link in one of the first direction or the second direction.

12. The apparatus of claim 5, further including a second tension-torsion strap coupled to the second blade, the second pitch arm extending from the second pitch link past a portion of the second tension-torsion strap disposed outside of the second housing arm.

13. A rotor hub comprising:
a shaft;
a first pitch link;
a second pitch link, at least a portion of an end of the first pitch link and at least a portion of an end of the second pitch link disposed in a first plane when the first pitch link and the second pitch link are in a first position;
a first pitch arm having a first end, a second end, a first portion, and a second portion, the first end of the first pitch arm coupled to the end of the first pitch link, the first portion of the first pitch arm extending from the end of the first pitch link in a first direction relative to the first plane, a second plane passing through the second portion of the first pitch arm;
a second pitch arm having a first end, a second end, a first portion, a second portion, and a third portion, the first end of the second pitch arm coupled to the end of the second pitch link, the first portion of the second pitch arm extending from the end of the second pitch link in a second direction relative to the first plane, a third plane passing through the second portion of the second pitch arm,
the first direction opposite the second direction,
the first plane disposed between the second plane and the third plane, each of the first plane, the second plane, and the third plane extending perpendicular to a longitudinal axis of the shaft when the first pitch link and the second pitch link are in the first position;
a first blade spindle, the second end of the first pitch arm coupled to the first blade spindle; and
a second blade spindle, the second end of the second pitch arm coupled to the second blade spindle, the third portion of the second pitch arm extending from the second portion of the second pitch arm in the first direction to couple the second end of the second pitch arm to the second blade spindle.

14. The apparatus of claim 5, wherein the at least the portion of the second pitch arm extending under the portion of the first tension-torsion strap disposed outside of the first housing arm extends in the second direction relative to the plane.

15. The rotor hub of claim 11, wherein the portion of the third pitch arm extends in the first direction and further including a fourth pitch link, the third pitch link is disposed between the second pitch link and the fourth pitch link.

16. The rotor hub of claim 13, wherein the second end of the first pitch arm is coupled to a portion of the first blade spindle and the second end of the second pitch arm is coupled to a portion of the second blade spindle, the portion of the second blade spindle different than the portion of the first blade spindle.

17. The rotor hub of claim 13, wherein the second end of the first pitch arm is coupled to an exterior surface of the first blade spindle and the second end of the second pitch arm is coupled to an exterior surface of the second blade spindle.

18. The apparatus of claim 1, wherein the second end of the first pitch arm is coupled to a portion of the first blade spindle and an end of the second pitch arm is coupled to a portion of the second blade spindle, the portion of the second blade spindle different than the portion of the first blade spindle.

19. The apparatus of claim 18, wherein the second end of the first pitch arm is coupled to an exterior surface of the first blade spindle and the end of the second pitch arm is coupled to an exterior surface of the second blade spindle.

20. The rotor hub of claim 11, further including a tension-torsion strap, wherein the second pitch arm extends under the tension-torsion strap.

* * * * *